US012095312B2

(12) United States Patent
Inuzuka

(10) Patent No.: US 12,095,312 B2
(45) Date of Patent: Sep. 17, 2024

(54) ELECTRIC WORK MACHINE

(71) Applicant: MAKITA CORPORATION, Anjo (JP)

(72) Inventor: Junya Inuzuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 268 days.

(21) Appl. No.: 17/824,474

(22) Filed: May 25, 2022

(65) Prior Publication Data

US 2023/0006516 A1 Jan. 5, 2023

(30) Foreign Application Priority Data

Jun. 30, 2021 (JP) .................. 2021-108492

(51) Int. Cl.
| | |
|---|---|
| *H02K 11/20* | (2016.01) |
| *H02K 1/16* | (2006.01) |
| *H02K 3/12* | (2006.01) |
| *H02K 7/00* | (2006.01) |
| *H02K 11/215* | (2016.01) |
| *H02K 11/30* | (2016.01) |

(52) U.S. Cl.
CPC .............. *H02K 11/215* (2016.01); *H02K 1/16* (2013.01); *H02K 3/12* (2013.01); *H02K 7/003* (2013.01); *H02K 11/20* (2016.01); *H02K 11/30* (2016.01)

(58) Field of Classification Search
CPC ........ H02K 11/215; H02K 1/16; H02K 11/30; H02K 3/12; H02K 7/003; H02K 11/20; H02K 1/146; H02K 1/2791; H02K 11/21; H02K 1/274; H02K 11/33; H02K 3/28; H02K 3/00

USPC ..................................... 310/68 B, 68 R, 198
See application file for complete search history.

(56) References Cited

U.S. PATENT DOCUMENTS

| | | |
|---|---|---|
| 6,790,134 B2 | 9/2004 | Swaddle et al. |
| 7,038,343 B2 | 5/2006 | Agnes et al. |
| 7,083,508 B2 | 8/2006 | Swaddle |

(Continued)

FOREIGN PATENT DOCUMENTS

| | | |
|---|---|---|
| CN | 107979254 A | 5/2018 |
| DE | 10 2016 205 648 A1 | 10/2017 |

(Continued)

OTHER PUBLICATIONS

Inuzuka Junya, Electric Working Machine, Apr. 30, 2020, WO 2020085322 (English Machine Translation) (Year: 2020).*

(Continued)

*Primary Examiner* — Alexander A Singh
(74) *Attorney, Agent, or Firm* — Oliff PLC

(57) ABSTRACT

A sensor board is downsized. An electric work machine includes a stator, a rotor rotatable about a rotation axis, magnetic sensors, a sensor board supporting the magnetic sensors, and an output unit drivable by the rotor. The stator includes a stator core, an insulator, and coils including first-, second-, and third-phase coils. The rotor includes a rotor core and magnets fixed to the rotor core. The magnetic sensors detect the magnets and include, in a circumferential direction, a first magnetic sensor aligned with at least a portion of a first coil pair, a second magnetic sensor aligned with at least a portion of a second coil pair, and a third magnetic sensor aligned with at least a portion of a third coil pair.

15 Claims, 23 Drawing Sheets

(56) References Cited

U.S. PATENT DOCUMENTS

| | | |
|---|---|---|
| 9,577,493 B2 | 2/2017 | Ekstrom et al. |
| 9,937,570 B2 | 4/2018 | Chen et al. |
| 10,193,417 B2 | 1/2019 | Fogle et al. |
| 10,424,998 B2 | 9/2019 | Keil et al. |
| 2010/0013336 A1 | 1/2010 | Ortt et al. |
| 2017/0077773 A1 | 3/2017 | Li et al. |
| 2018/0013329 A1* | 1/2018 | Aoyama ............... H02K 7/145 |
| 2019/0006909 A1* | 1/2019 | Nagahama ............ H02K 11/21 |
| 2020/0161927 A1* | 5/2020 | Marjomaa ............. H02K 3/522 |
| 2020/0343789 A1* | 10/2020 | Fogle ....................... H02K 1/28 |

FOREIGN PATENT DOCUMENTS

| | | | |
|---|---|---|---|
| EP | 1 641 104 A2 | 3/2006 | |
| EP | 2 214 296 A1 | 8/2010 | |
| JP | 2017-135949 A | 8/2017 | |
| WO | 2015/050484 A1 | 4/2015 | |
| WO | WO-2017002869 A1 * | 1/2017 | .............. H02K 1/27 |
| WO | 2017/097520 A1 | 6/2017 | |
| WO | 2017/097539 A1 | 6/2017 | |
| WO | WO-2020085322 A1 * | 4/2020 | |

OTHER PUBLICATIONS

Ohori et al, Brushless Motor, Jan. 15, 2017, WO 2017002869 (English Machine Translation) (Year: 2017).*

* cited by examiner

FIG. 21

|     | Hp1  | Hp2  | Hp3  | Hp4  | Hp5  | Hp6  |
| --- | ---- | ---- | ---- | ---- | ---- | ---- |
| HAu | High | High | High | Low  | Low  | Low  |
| HAv | High | High | Low  | Low  | Low  | High |
| HAw | High | Low  | Low  | Low  | High | High |

|     | Dp1 | Dp2 | Dp3 | Dp4 | Dp5 | Dp6 |
| --- | --- | --- | --- | --- | --- | --- |
| DHu | OFF | OFF | OFF | ON  | ON  | OFF |
| DHv | ON  | OFF | OFF | OFF | OFF | ON  |
| DHw | OFF | ON  | ON  | OFF | OFF | OFF |
| DLu | ON  | ON  | OFF | OFF | OFF | OFF |
| DLv | OFF | OFF | ON  | ON  | OFF | OFF |
| DLw | OFF | OFF | OFF | OFF | ON  | ON  |

FIG. 22

|     | Hp1  | Hp2  | Hp3  | Hp4  | Hp5  | Hp6  |
|-----|------|------|------|------|------|------|
| HAu | High | High | High | Low  | Low  | Low  |
| HAv | Low  | Low  | High | High | High | Low  |
| HAw | High | Low  | Low  | Low  | High | High |

|     | Dp1 | Dp2 | Dp3 | Dp4 | Dp5 | Dp6 |
|-----|-----|-----|-----|-----|-----|-----|
| DHu | OFF | OFF | OFF | ON  | ON  | OFF |
| DHv | ON  | OFF | OFF | OFF | OFF | ON  |
| DHw | OFF | ON  | ON  | OFF | OFF | OFF |
| DLu | ON  | ON  | OFF | OFF | OFF | OFF |
| DLv | OFF | OFF | ON  | ON  | OFF | OFF |
| DLw | OFF | OFF | OFF | OFF | ON  | ON  |

ELECTRIC WORK MACHINE

CROSS-REFERENCE TO RELATED APPLICATIONS

This application claims the benefit of priority to Japanese Patent Application No. 2021-108492, filed on Jun. 30, 2021, the entire contents of which are hereby incorporated by reference.

BACKGROUND

1. Technical Field

The present disclosure relates to an electric work machine.

2. Description of the Background

In the field of electric work machines, an electric work machine is known as described in, for example, Japanese Unexamined Patent Application Publication No. 2017-135949 (hereafter, Patent Literature 1). Patent Literature 1 describes a technique for controlling a motor in accordance with the angle of advance.

BRIEF SUMMARY

A motor includes a stator with coils and a rotor with magnets. The position of the rotor in the rotation direction is detected by magnetic sensors attached to a sensor board. A smaller sensor board is awaited to develop a smaller and less costly motor.

One or more aspects of the present disclosure are directed to downsizing a sensor board.

A first aspect of the present disclosure provides an electric work machine, including:
a stator including
a stator core including a plurality of teeth,
an insulator fixed to the stator core,
coils each wound around a corresponding tooth of the plurality of teeth with the insulator in between, the coils including
a plurality of first-phase coils assigned to a first phase,
a plurality of second-phase coils assigned to a second phase, and
a plurality of third-phase coils assigned to a third phase,
two of the plurality of first-phase coils adjacent to each other being included in a first coil pair,
two of the plurality of second-phase coils adjacent to each other being included in a second coil pair,
two of the plurality of third-phase coils adjacent to each other being included in a third coil pair,
the second coil pair being adjacent in a first circumferential direction to the third coil pair, the first coil pair being adjacent in the first circumferential direction to the second coil pair,
the first coil pair including a first-phase coil located in the first circumferential direction, the first-phase coil having a winding direction different from a winding direction of a first-phase coil located in a second circumferential direction in the first coil pair,
the second coil pair including a second-phase coil located in the first circumferential direction, the second-phase coil having a winding direction different from a winding direction of a second-phase coil located in the second circumferential direction in the second coil pair,
the third coil pair including a third-phase coil located in the first circumferential direction, the third-phase coil having a winding direction different from a winding direction of a third-phase coil located in the second circumferential direction in the third coil pair,
the first coil pair and the second coil pair adjacent to each other including the first-phase coil located in the second circumferential direction in the first coil pair and the second-phase coil located in the first circumferential direction in the second coil pair, the first-phase coil and the second-phase coil having a same winding direction,
the second coil pair and the third coil pair adjacent to each other including the second-phase coil located in the second circumferential direction in the second coil pair and the third-phase coil located in the first circumferential direction in the third coil pair, the second-phase coil and the third-phase coil having a same winding direction;
a rotor rotatable about a rotation axis, the rotor including
a rotor core, and
a plurality of magnets fixed to the rotor core;
a plurality of magnetic sensors configured to detect the plurality of magnets, the plurality of magnetic sensors including, in a circumferential direction,
a first magnetic sensor aligned with at least a portion of the first coil pair,
a second magnetic sensor aligned with at least a portion of the second coil pair, and
a third magnetic sensor aligned with at least a portion of the third coil pair;
a sensor board supporting the magnetic sensors; and
an output unit drivable by the rotor.

The above aspect of the present disclosure downsizes the sensor board.

BRIEF DESCRIPTION OF DRAWINGS

FIG. 21 is a table showing detection patterns of magnetic sensors and driving patterns for switching elements in the embodiment.

FIG. 22 is a table showing the detection patterns of the magnetic sensors and the driving patterns for the switching elements in the embodiment.

DETAILED DESCRIPTION

Although one or more embodiments will now be described with reference to the drawings, the present disclosure is not limited to the embodiments described below. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of an electric work machine.

The electric work machine includes a motor. In the embodiments, a direction radial from a rotation axis AX of the motor is referred to as a radial direction or radially for convenience. A direction parallel to the rotation axis AX of the motor is referred to as an axial direction for convenience. A direction about the rotation axis AX of the motor is referred to as a circumferential direction, circumferentially, or a rotation direction for convenience.

A position nearer the rotation axis AX of the motor in the radial direction, or a radial direction toward the rotation axis AX, is referred to as being radially inward for convenience. A position farther from the rotation axis AX of the motor in the radial direction, or a radial direction away from the rotation axis AX, is referred to as being radially outward for convenience.

A position in one axial direction, or one axial direction, is referred to as a first axial direction for convenience. A position in the other axial direction, or the other axial direction, is referred to as a second axial direction for convenience. In the embodiments, the axial direction is the vertical direction. When the first axial direction is an upward direction, the second axial direction is a downward direction. When the first axial direction is a downward direction, the second axial direction is an upper direction.

A position in one circumferential direction, or one circumferential direction, is referred to as a first circumferential direction for convenience. A position in the other circumferential direction, or the other circumferential direction, is referred to as a second circumferential direction for convenience.

Electric Work Machine

Figure 1:
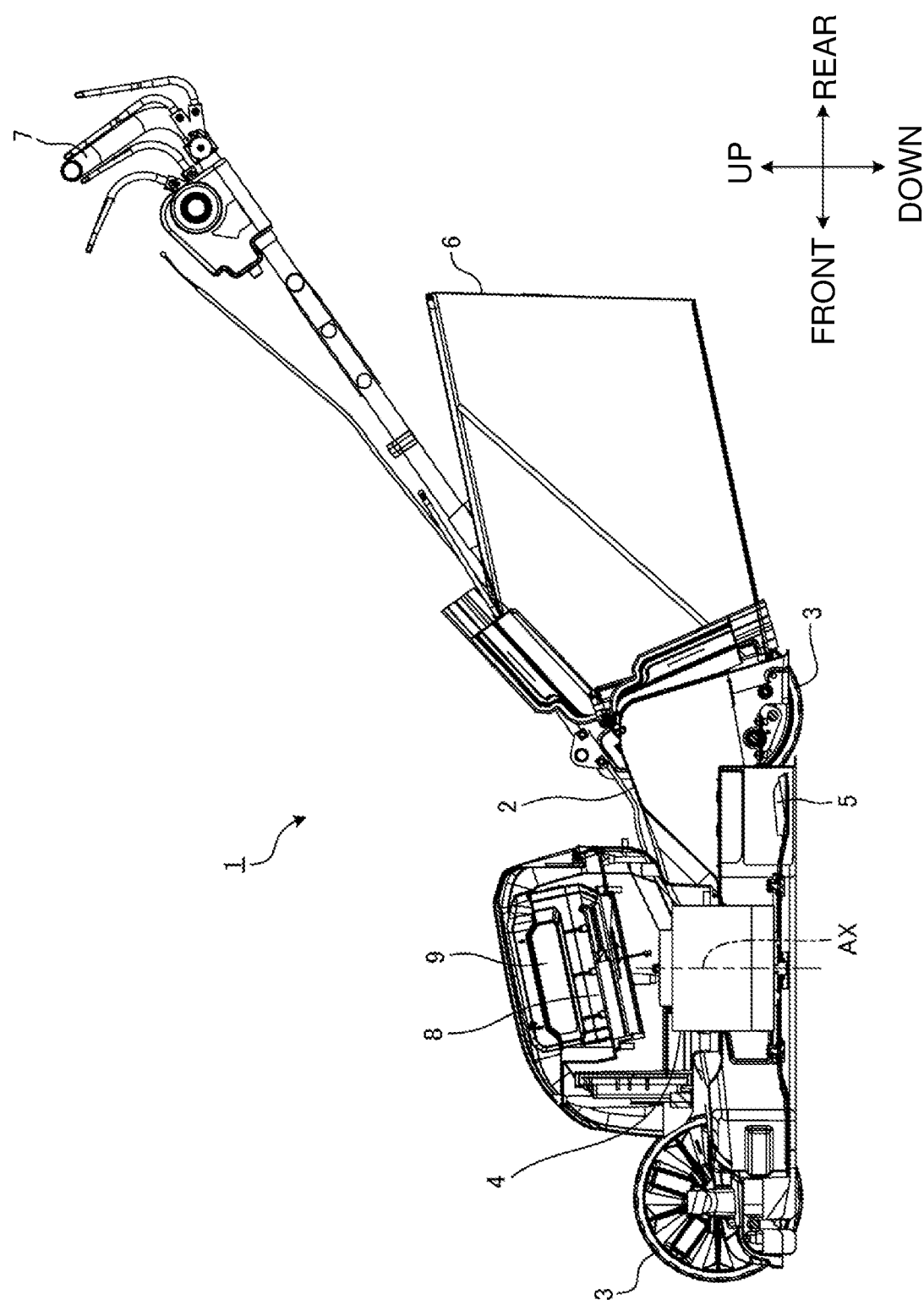
FIG. 1 is a diagram of an electric work machine according to an embodiment.

FIG. 1 is a diagram of an electric work machine 1 according to an embodiment. The electric work machine 1 according to the present embodiment is a lawn mower, which is an example of outdoor power equipment.

As shown in FIG. 1, the electric work machine 1 includes a housing 2, wheels 3, a motor 4, a cutting blade 5, a grass box 6, a handle 7, and a battery mount 8.

The housing 2 accommodates the motor 4 and the cutting blade 5. The housing 2 supports the wheels 3, the motor 4, and the cutting blade 5.

The wheels 3 rotate on the ground. Thus, the electric work machine 1 moves on the ground. The electric work machine 1 includes four wheels 3.

The motor 4 is a power source for the electric work machine 1. The motor 4 generates a rotational force for rotating the cutting blade 5. The motor 4 is located above the cutting blade 5.

The cutting blade 5 is connected to the motor 4. The cutting blade 5 is an output unit in the electric work machine 1 that is drivable by the motor 4. The cutting blade 5 is rotatable about the rotation axis AX of the motor 4 under the rotational force generated by the motor 4. The cutting blade 5 faces the ground. The cutting blade 5, with the wheels 3 in contact with the ground, rotates while mowing grass on the ground. The grass mown by the cutting blade 5 is collected in the grass box 6.

A user holds the handle 7 of the electric work machine 1 with his or her hand. The user holding the handle 7 can move the electric work machine 1.

The battery mount 8 receives a battery pack 9. The battery pack 9 supplies power to the electric work machine 1. The battery pack 9 is detachable from the battery mount 8. The battery pack 9 includes a secondary battery. The battery pack 9 in the present embodiment includes a rechargeable lithium-ion battery. The battery pack 9 is attached to the battery mount 8 to power the electric work machine 1. The battery pack 9 provides a driving current to drive the motor 4.

Motor

Figure 2:
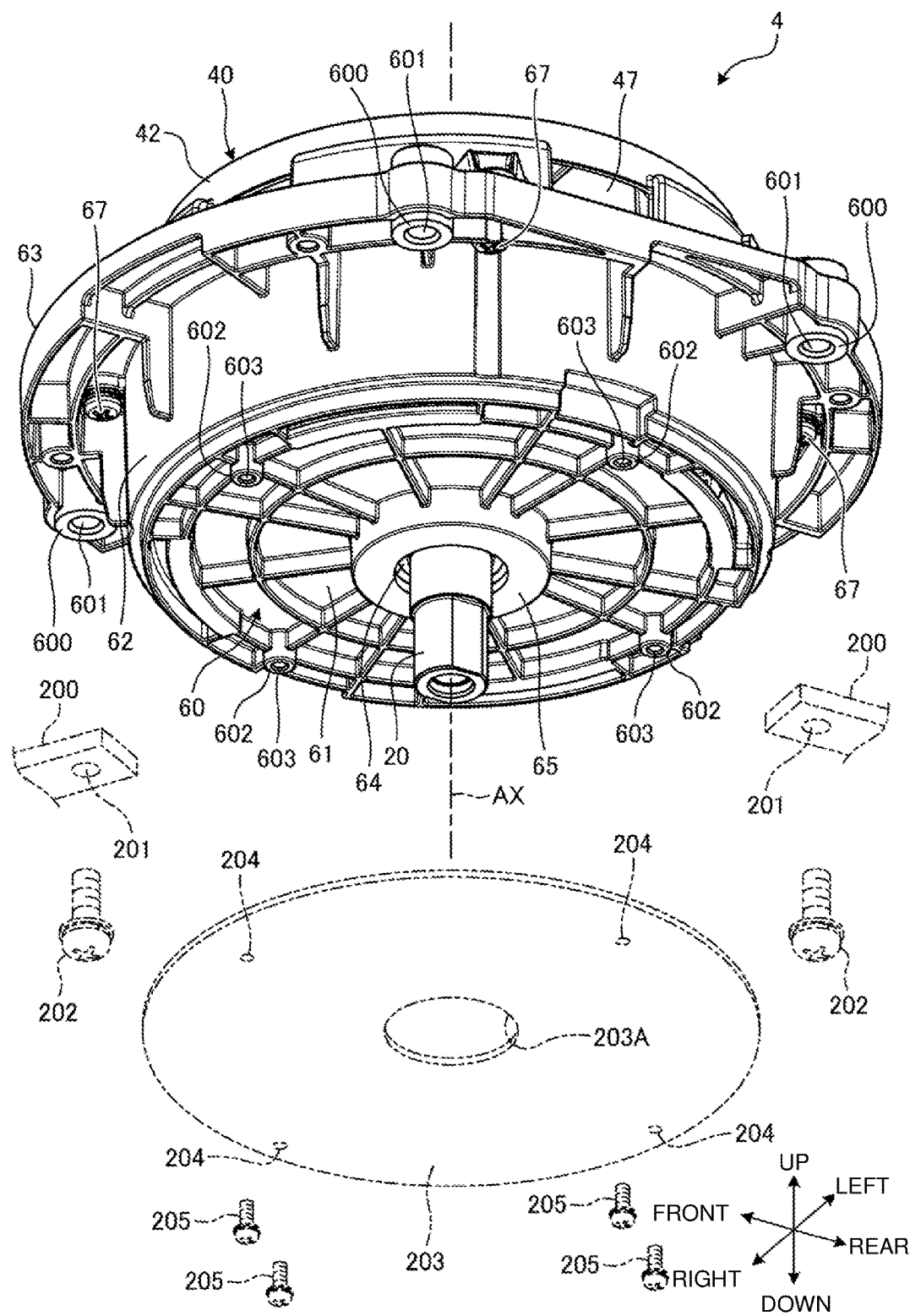
FIG. 2 is a perspective view of a motor in the embodiment as viewed from below.
Figure 3:
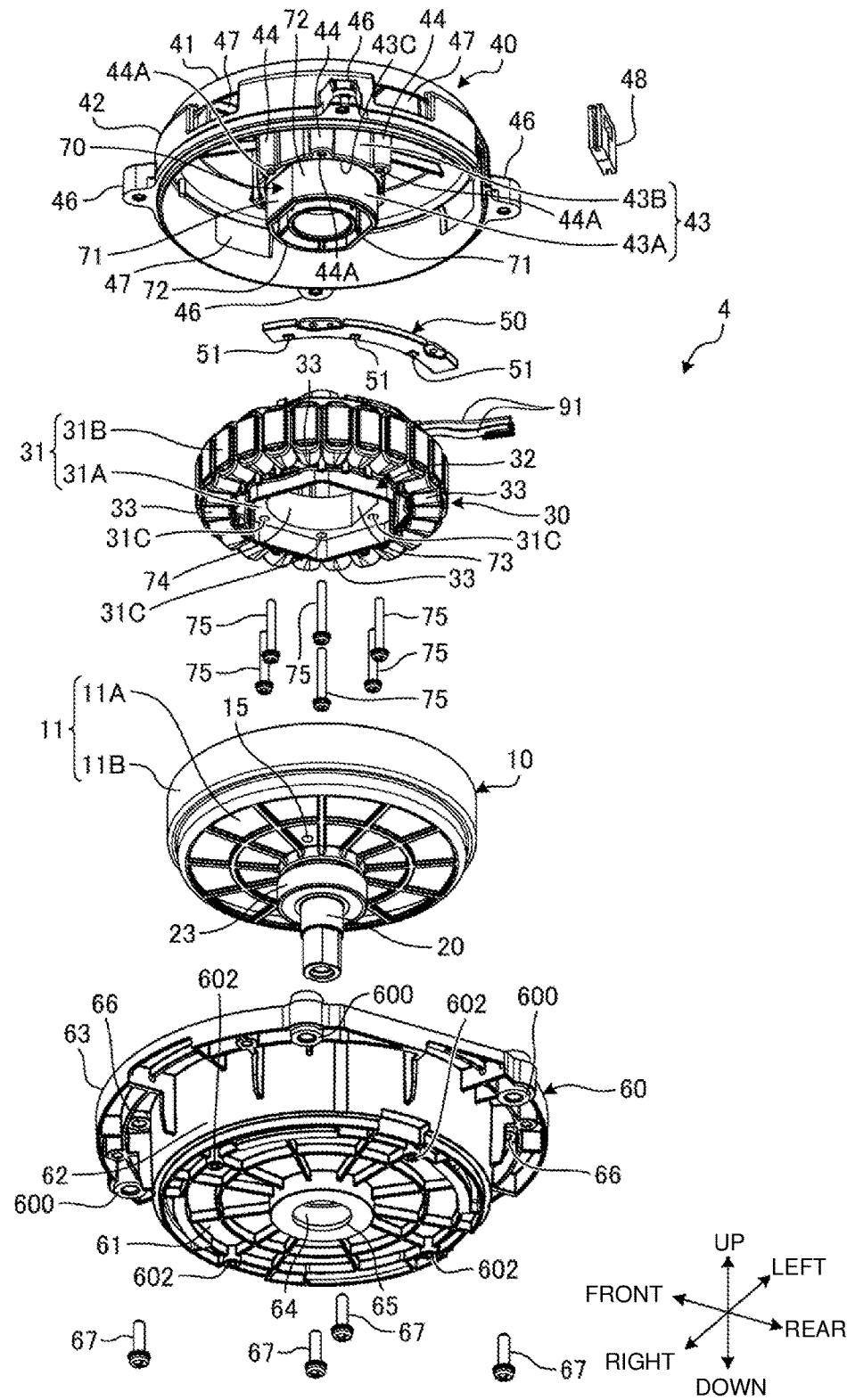
FIG. 3 is an exploded perspective view of the motor in the embodiment as viewed from below.
Figure 4:
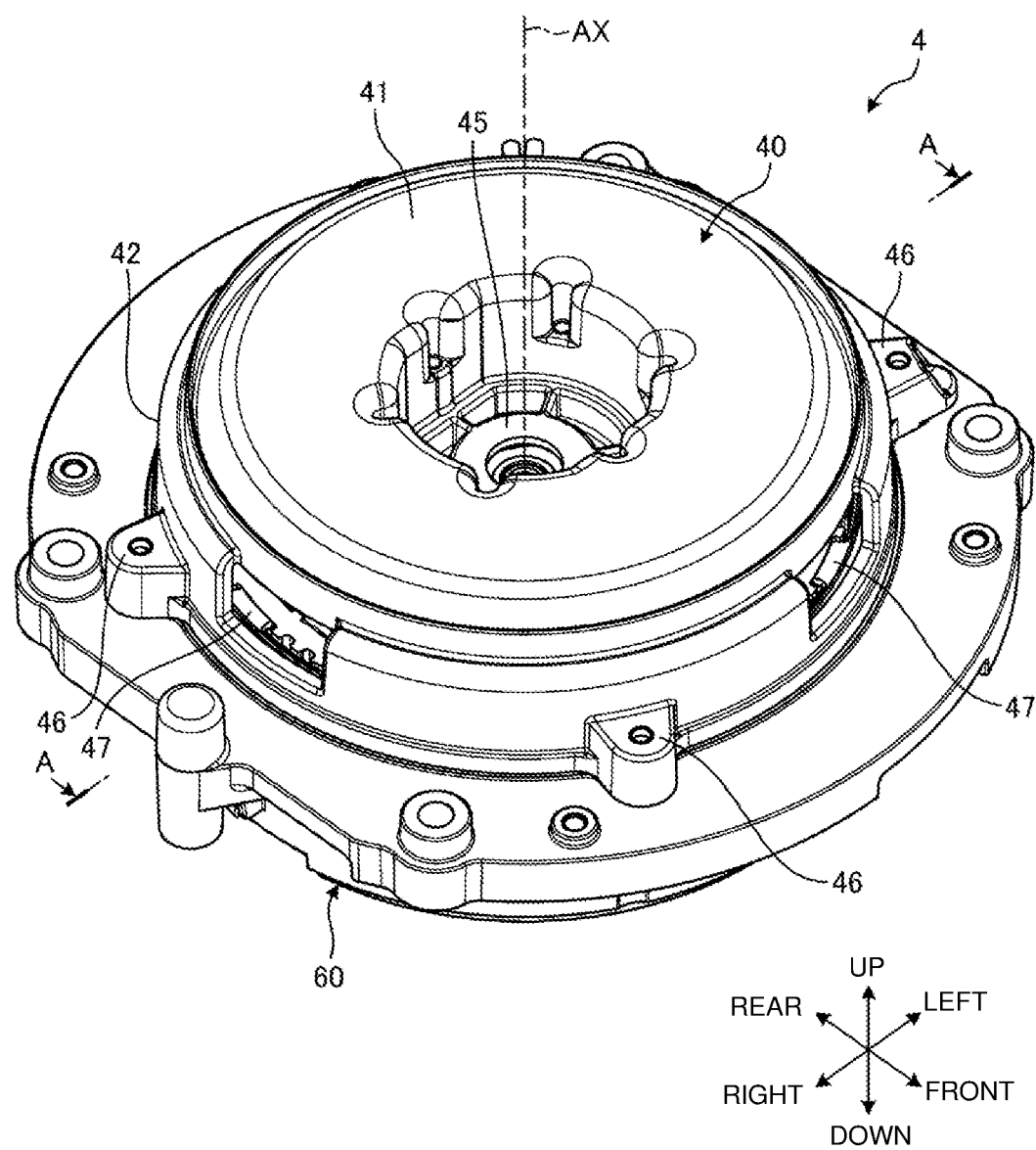
FIG. 4 is a perspective view of the motor in the embodiment as viewed from above.
Figure 5:
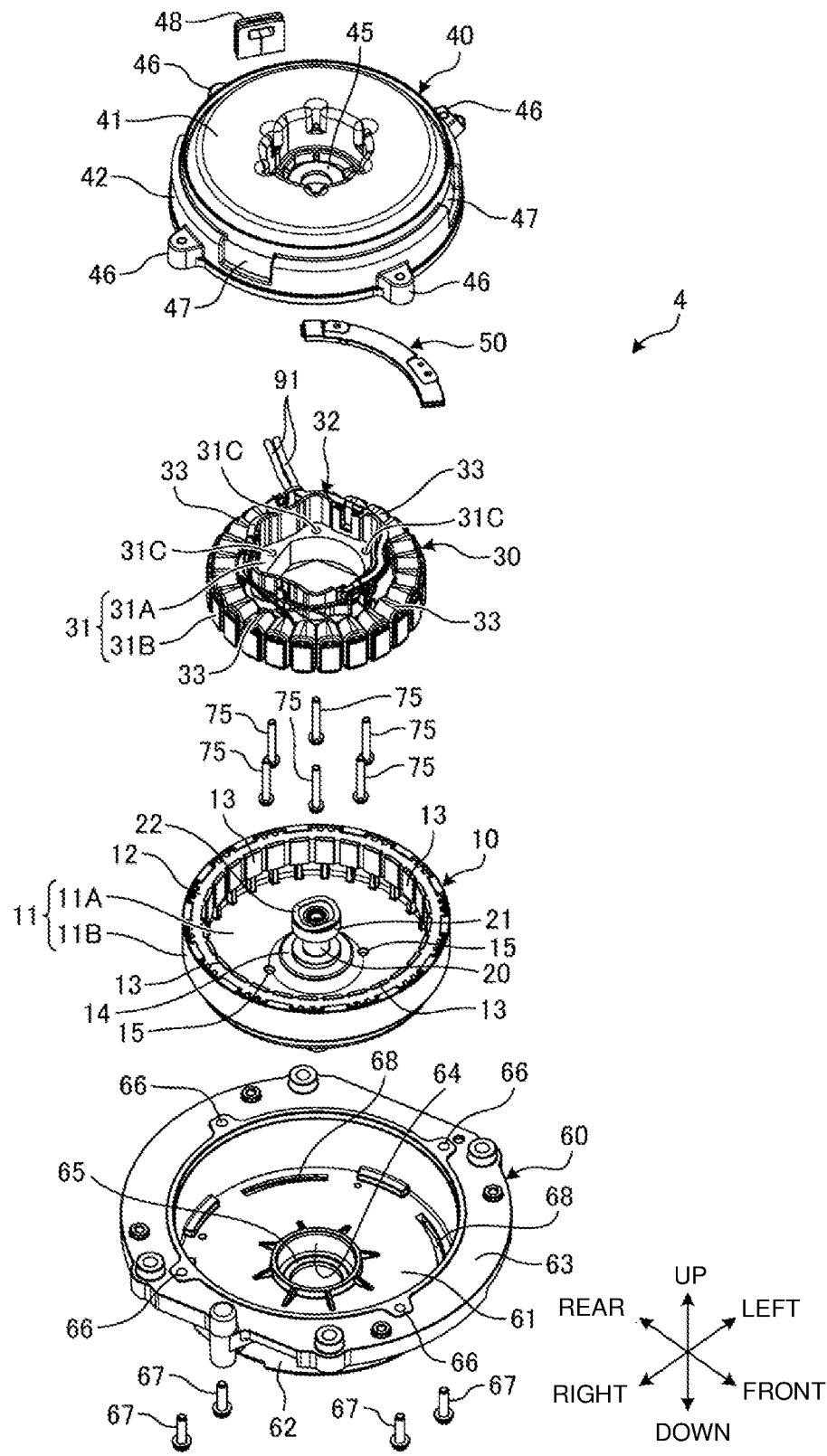
FIG. 5 is an exploded perspective view of the motor in the embodiment as viewed from above.
Figure 6:
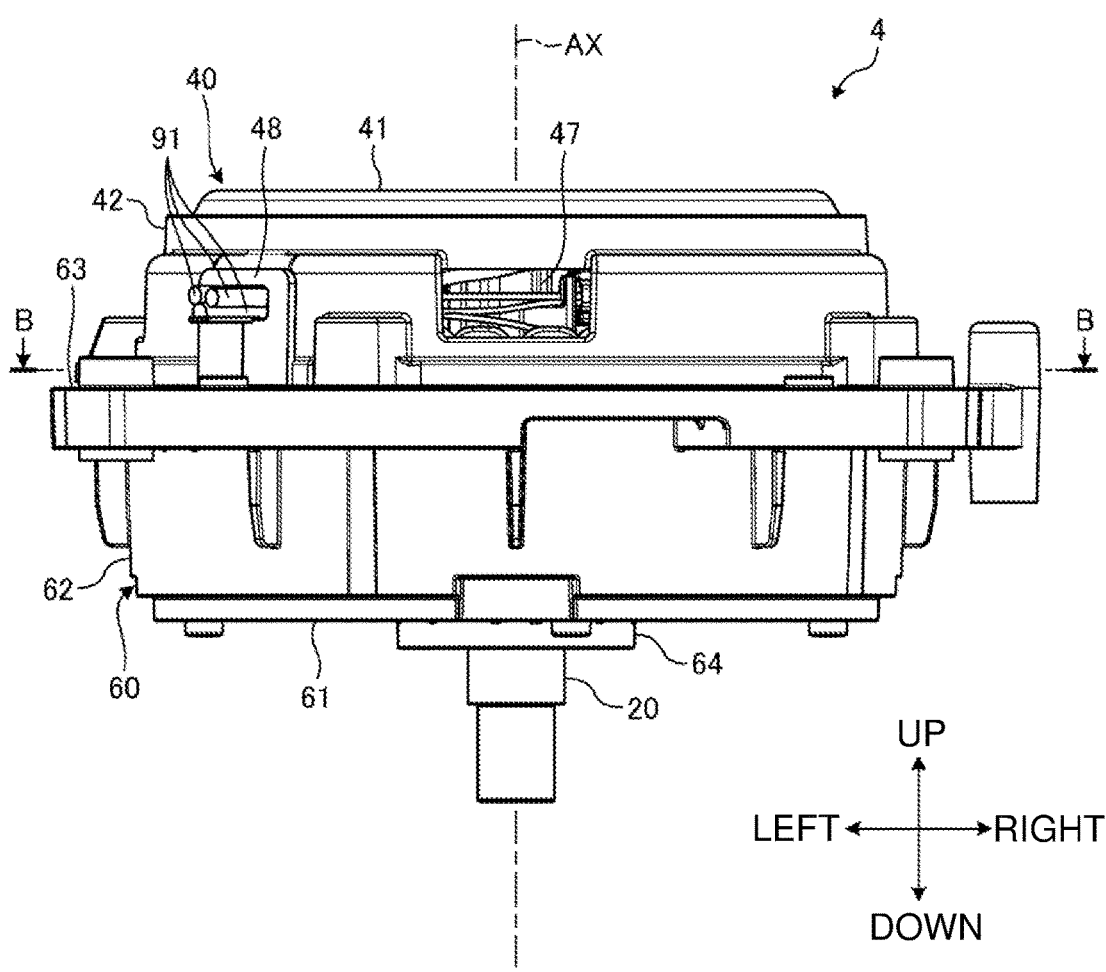
FIG. 6 is a front view of the motor in the embodiment.
Figure 7:
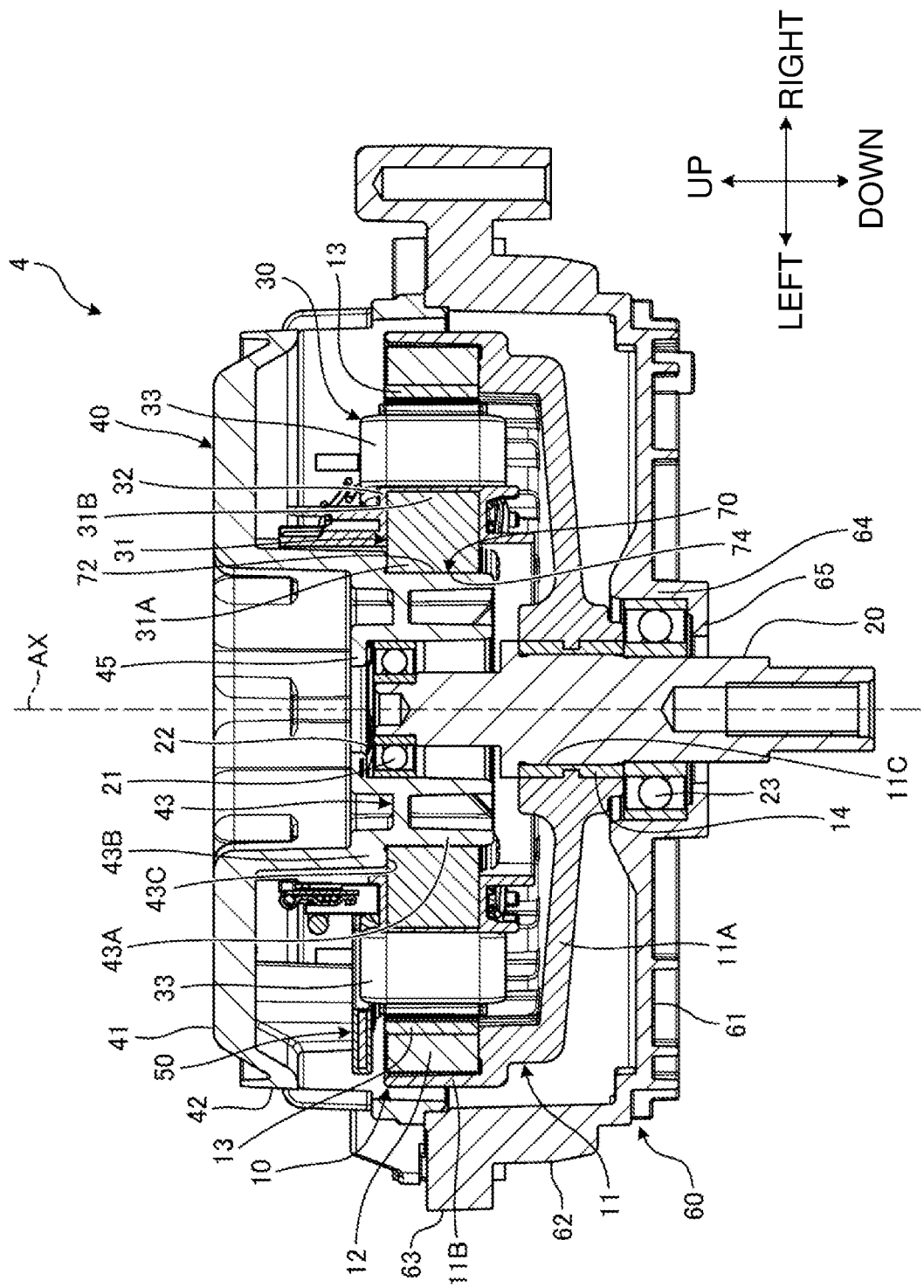
FIG. 7 is a longitudinal cross-sectional view of the motor in the embodiment.
Figure 8:
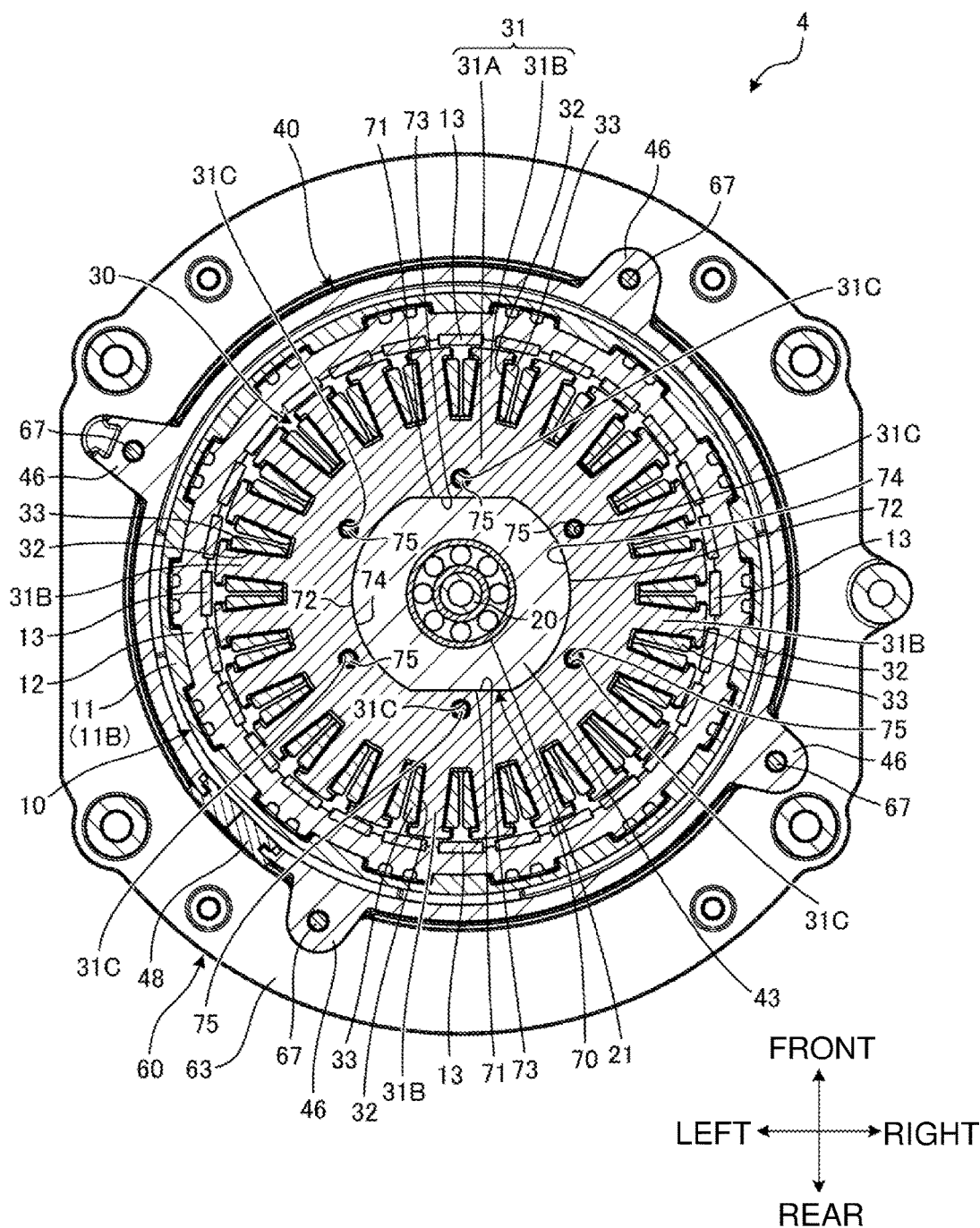
FIG. 8 is a cross-sectional view of the motor in the embodiment.

FIG. 2 is a perspective view of the motor 4 in the embodiment as viewed from below. FIG. 3 is an exploded perspective view of the motor 4 in the embodiment as viewed from below. FIG. 4 is a perspective view of the motor 4 in the embodiment as viewed from above. FIG. 5 is an exploded perspective view of the motor 4 in the embodiment as viewed from above. FIG. 6 is a front view of the motor 4 in the embodiment. FIG. 7 is a longitudinal cross-sectional view of the motor 4 in the embodiment. FIG. 7 is a cross-sectional view taken along line A-A in FIG. 4 as viewed in the direction indicated by arrows. FIG. 8 is a cross-sectional view of the motor 4 in the embodiment. FIG. 8 is a cross-sectional view taken along line B-B in FIG. 6 as viewed in the direction indicated by arrows. The motor 4 in the embodiment is an outer-rotor brushless motor.

As shown in FIGS. 2 to 8, the motor 4 includes a rotor 10, a rotor shaft 20, a stator 30, a stator base 40, a sensor board 50, and a motor housing 60. The rotor 10 rotates relative to the stator 30. The rotor 10 at least partially surrounds the stator 30. The rotor 10 is located outside the periphery of the stator 30. The rotor shaft 20 is fixed to the rotor 10. The rotor 10 and the rotor shaft 20 rotate about the rotation axis AX. The stator base 40 supports the stator 30. The cutting blade 5 is connected to the rotor shaft 20. The cutting blade 5 is drivable by the rotor 10. The sensor board 50 supports magnetic sensors for detecting rotation of the rotor 10.

The motor 4 in the embodiment has the rotation axis AX extending vertically. The axial direction and the vertical direction are parallel to each other.

The rotor 10 includes a rotor cup 11, a rotor core 12, and magnets 13.

The rotor cup 11 is formed from an aluminum-based metal. The rotor cup 11 includes a plate 11A and a yoke 11B.

The plate 11A is substantially annular. The plate 11A surrounds the rotation axis AX. The plate 11A has the central axis aligned with the rotation axis AX. The plate 11A has an opening 11C in its center. The rotor shaft 20 is at least partially located in the opening 11C. In the embodiment, a bush 14 is located between the outer surface of the rotor shaft 20 and the inner surface of the opening 11C.

The yoke 11B is substantially cylindrical. The yoke 11B has a lower end connected to the periphery of the plate 11A. The plate 11A is integral with the yoke 11B. The yoke 11B extends upward from the periphery of the plate 11A. The yoke 11B surrounds the stator 30. The yoke 11B surrounds the rotation axis AX. The yoke 11B has the central axis aligned with the rotation axis AX.

The rotor core 12 includes multiple steel plates stacked in the axial direction. The rotor core 12 is substantially cylindrical. The rotor core 12 is located outside the periphery of the stator 30. The rotor core 12 is supported by the rotor cup 11. The rotor cup 11 at least partially surrounds the rotor core 12. The rotor core 12 is located radially inside the yoke 11B. The rotor core 12 is surrounded by the yoke 11B. The rotor core 12 is supported on the inner circumferential surface of the yoke 11B.

The magnets 13 are permanent magnet plates. The magnets 13 are sintered plate magnets. The magnets 13 are fixed to the rotor core 12. The magnets 13 are located radially inside the rotor core 12. The magnets 13 are fixed to the inner circumferential surface of the rotor core 12. The magnets 13 in the embodiment are fixed to the inner circumferential surface of the rotor core 12 with an adhesive. The multiple (28 in the embodiment) magnets 13 are arranged at circumferentially equal intervals with their N poles and S poles located alternately in the circumferential direction.

The rotor shaft 20 extends in the axial direction. The rotor shaft 20 is fixed to the rotor 10. The rotor 10 includes a lower portion received inside the opening 11C in the plate 11A. The rotor shaft 20 is fastened to the plate 11A with the bush 14. The upper end of the rotor shaft 20 is located above the upper surface of the plate 11A. The lower end of the rotor shaft 20 is located below the lower surface of the plate 11A.

The rotor shaft 20 has the central axis aligned with the rotation axis AX. The rotor shaft 20 is fixed to the rotor 10 to align the central axis of the rotor shaft 20 with the central axis of the yoke 11B.

The stator 30 includes a stator core 31, an insulator 32, and coils 33.

The stator core 31 includes multiple steel plates stacked in the axial direction. The stator core 31 includes a yoke 31A and teeth 31B. The yoke 31A is cylindrical. The yoke 31A surrounds the rotation axis AX. The yoke 31A has an outer circumferential surface with the central axis aligned with the rotation axis AX. Each tooth 31B protrudes radially outward from the outer circumferential surface of the yoke 31A. Multiple (24 in the embodiment) teeth 31B are located circumferentially at intervals. The teeth 31B adjacent to each other have a slot between them.

The insulator 32 is formed from a synthetic resin. The insulator 32 is fixed to the stator core 31. The insulator 32 at least partially covers the surface of the stator core 31. The insulator 32 at least partially covers end faces of the yoke 31A facing in the axial direction. The end faces of the yoke 31A include an upper end face facing upward and a lower end face facing downward. The insulator 32 at least partially covers the outer surface of the yoke 31A facing radially outward. The insulator 32 at least partially covers the surfaces of the teeth 31B.

The stator core 31 and the insulator 32 in the embodiment are integral with each other. The insulator 32 is fixed to the stator core 31 by insert molding. The stator core 31 accommodated in a die receives injection of a heat-melted synthetic resin. The synthetic resin then solidifies to form the insulator 32 fixed to the stator core 31.

The coils 33 are attached to the insulator 32. Each coil 33 is wound around each of the teeth 31B with the insulator 32 in between. The insulator 32 covers the surfaces of the teeth 31B around which the coils 33 are wound. The insulator 32 does not cover the outer surface of each tooth 31B that faces radially outward. The stator core 31 and the coil 33 are insulated from each other by the insulator 32. The stator 30 includes multiple (24 in the embodiment) coils 33 arranged circumferentially.

The stator base 40 supports the stator core 31. The stator base 40 is fixed to the stator core 31. The stator base 40 is formed from aluminum. The stator base 40 includes a plate 41, a peripheral wall 42, and a pipe 43.

The plate 41 is substantially annular. The plate 41 surrounds the rotation axis AX. The plate 41 is located above the stator 30.

The peripheral wall 42 is substantially cylindrical. The peripheral wall 42 includes the upper end connected to the periphery of the plate 41. The plate 41 and the peripheral wall 42 are integral with each other. The peripheral wall 42 extends downward from the periphery of the plate 41. The peripheral wall 42 surrounds the yoke 11B in the rotor cup 11.

The pipe 43 is substantially cylindrical. The pipe 43 protrudes downward from a center portion of the lower surface of the plate 41. The pipe 43 surrounds the rotation axis AX. The pipe 43 has the central axis aligned with the rotation axis AX.

The pipe 43 is located at least partially inside the stator core 31. The pipe 43 has the central axis aligned with the central axis of the yoke 31A.

The pipe 43 in the embodiment includes a smaller-diameter portion 43A and a larger-diameter portion 43B. The larger-diameter portion 43B is located upward from the smaller-diameter portion 43A. The smaller-diameter portion 43A and the larger-diameter portion 43B are both cylindrical. The larger-diameter portion 43B has a larger outer diameter than the smaller-diameter portion 43A.

The stator core 31 surrounds the smaller-diameter portion 43A. The larger-diameter portion 43B is located outside the stator core 31. The larger-diameter portion 43B is located above the stator core 31. The stator core 31 is fixed to the pipe 43. The stator base 40 is fixed to the stator 30 with the central axis of the pipe 43 aligned with the central axis of the yoke 31A.

The motor 4 includes a motor positioner 70 for positioning the stator base 40 and the stator 30. The stator base 40 and the stator core 31 are positioned with the motor positioner 70.

The smaller-diameter portion 43A in the embodiment has the outer surface including at least two positions located circumferentially each including a base flat area 71. In the embodiment, one base flat area 71 is located in front of the rotation axis AX, and the other base flat area 71 is located behind the rotation axis AX. The two base flat areas 71 are substantially parallel to each other. The smaller-diameter portion 43A has the outer surface including base curved areas 72. One base curved area 72 is located on the left of the rotation axis AX, and the other base curved area 72 is located on the right of the rotation axis AX.

The yoke 31A in the stator core 31 has an inner surface including stator flat areas 73 and stator curved areas 74. The stator flat areas 73 are in contact with the base flat areas 71. The stator curved areas 74 are in contact with the base curved areas 72.

The motor positioner 70 includes the base flat areas 71 and the stator flat areas 73. The stator flat areas 73 are in contact with the base flat areas 71. The motor positioner 70 includes the base curved areas 72 and the stator curved areas 74. The stator curved areas 74 are in contact with the base curved areas 72.

The base flat areas 71 in contact with the stator flat areas 73 allow the stator base 40 and the stator core 31 to be positioned relative to each other both circumferentially and radially. The base curved areas 72 in contact with the stator curved areas 74 allow the stator base 40 and the stator core 31 to be positioned relative to each other both circumferentially and radially.

The pipe 43 has a base support surface 43C including the boundary between the smaller-diameter portion 43A and the larger-diameter portion 43B. The base support surface 43C faces downward. The base support surface 43C surrounds the smaller-diameter portion 43A.

The base support surface 43C is in contact with the upper end face of the yoke 31A in the stator core 31.

The motor positioner 70 has the base support surface 43C. The base support surface 43C on the pipe 43 in contact with the upper end face of the yoke 31A allows the stator base 40 and the stator core 31 to be positioned relative to each other in the axial direction.

The stator core 31 and the stator base 40 in the embodiment are fastened together with screws 75. The yoke 31A in the stator core 31 has core threaded openings 31C. Each core threaded opening 31C has a through-hole extending from the upper end face to the lower end face of the yoke 31A. Multiple core threaded openings 31C surround the rotation axis AX at intervals.

Screw bosses 44 surround the pipe 43. The screw bosses 44 surround the larger-diameter portion 43B. Each screw boss 44 has a base threaded hole 44A. Multiple screw bosses 44 surround the larger-diameter portion 43B at intervals. In other words, multiple base threaded holes 44A surround the rotation axis AX at intervals.

At least six (six in the embodiment) core threaded openings 31C and at least six (six in the embodiment) base threaded holes 44A are located. The multiple core threaded openings 31C and the multiple base threaded holes 44A surround the rotation axis AX at equal intervals.

The stator core 31 and the stator base 40 in the embodiment are fastened together with six screws 75. The screws 75 are placed into the corresponding core threaded openings 31C from below the stator core 31. Each screw 75 placed through the corresponding core threaded opening 31C has the distal end to be received in the corresponding base threaded hole 44A in the screw boss 44. Threads on the screws 75 are engaged with threaded grooves on the base threaded holes 44A to fasten the stator core 31 and the stator base 40 together.

The motor positioner 70 includes the screws 75. Each screw 75 placed through the corresponding core threaded opening 31C located in the stator core 31 is further placed into the corresponding base threaded hole 44A in the stator base 40. The stator base 40 and the stator core 31 are fastened together with the screws 75.

The pipe 43 supports the rotor shaft 20 with a bearing 21 between them. The bearing 21 is received in the pipe 43. The rotor shaft 20 includes an upper portion located in the pipe 43. The bearing 21 rotatably supports the upper portion of the rotor shaft 20. The rotor shaft 20 is supported by the pipe 43 with the bearing 21 between them.

The stator base 40 in the embodiment includes an annular plate 45 located on the upper end of the pipe 43. The bearing 21 has its upper surface located below the lower surface of the annular plate 45. A wave washer 22 is located between the upper surface of the bearing 21 and the lower surface of the annular plate 45. The bearing 21 has its outer circumferential surface supported on the inner surface of the pipe 43. The bearing 21 has the upper surface supported by the annular plate 45 with the wave washer 22 between them.

The sensor board 50 is supported by the stator base 40. The sensor board 50 is in contact with the stator base 40. The sensor board 50 is fixed to the stator base 40. The sensor board 50 includes magnetic sensors 51. The magnetic sensors 51 detect the magnetic flux of the magnets 13 in the rotor 10. The magnetic sensors 51 are supported by the sensor board 50. The magnetic sensors 51 detect changes of the magnetic flux resulting from rotation of the rotor 10 to detect the position of the rotor 10 in the rotation direction. The sensor board 50 is supported by the stator base 40 with the magnetic sensors 51 facing the magnets 13. The sensor board 50 is radially outward from the coils 33.

The motor housing 60 accommodates the rotor 10 and the stator 30. The motor housing 60 is connected to the stator base 40. An internal space between the motor housing 60 and the stator base 40 accommodates the rotor 10 and the stator 30.

The motor housing 60 includes a plate 61, a peripheral wall 62, and a flange 63.

The plate 61 is substantially annular. The plate 61 is located below the rotor cup 11. The plate 61 includes a pipe 64 in its center. A lower portion of the rotor shaft 20 is located in the pipe 64.

The motor housing 60 supports a bearing 23. The bearing 23 rotatably supports the lower portion of the rotor shaft 20. The motor housing 60 in the embodiment includes an annular plate 65 located at the lower end of the pipe 64. The bearing 23 has the lower surface located above the upper surface of the annular plate 65. The bearing 23 has the outer circumferential surface supported on the inner surface of the pipe 64. The bearing 23 has the lower surface supported on the upper surface of the annular plate 65.

The peripheral wall 62 is substantially cylindrical. The peripheral wall 62 has its lower end connected to the periphery of the plate 61. The peripheral wall 62 protrudes upward from the periphery of the plate 61. The peripheral wall 62 at least partially surrounds the rotor cup 11.

The flange 63 is connected to the upper end of the peripheral wall 62. The flange 63 extends radially outward from the upper end of the peripheral wall 62. The flange 63 has multiple (four in the embodiment) through-holes 66 located circumferentially at intervals.

The peripheral wall 42 in the stator base 40 includes multiple (four in the embodiment) screw bosses 46 located circumferentially at intervals. Each of the four screw bosses 46 has a threaded hole.

The stator base 40 and the motor housing 60 are fastened together with four screws 67. The screws 67 are placed into the corresponding through-holes 66 from below the flange 63. Each screw 67 placed through the corresponding through-hole 66 has the distal end to be received in the corresponding threaded hole in the screw boss 46. Threads on the screw 67 are engaged with threaded grooves on the threaded holes in the screw bosses 46 to fasten the stator base 40 and the motor housing 60 together.

The peripheral wall 42 in the stator base 40 has multiple openings 47. One of the openings 47 receives a shock absorber 48. The shock absorber 48 is formed from, for example, rubber. The shock absorber 48 received in the opening 47 supports at least a part of a power line 91, which is described later. The shock absorber 48 prevents wear of the power line 91.

The plate 61 has an air passage 68. The air passage 68 includes a flow channel with a labyrinth structure. For the rotor shaft 20 receiving a cooling fan fixed to its lower end, the cooling fan rotates as the rotor shaft 20 rotates. The cooling fan draws air through the air passage 68 from the internal space between the stator base 40 and the motor housing 60. Air drawn through the air passage 68 causes air around the motor 4 to flow into the internal space through the openings 47. This cools the motor 4.

The rotor cup 11 includes outlets 15. The outlets 15 discharge foreign matter inside the rotor cup 11. Two outlets 15 are located in the plate 11A. For example, water entering the rotor cup 11 is discharged out of the rotor cup 11 through the outlets 15.

As shown in FIG. 2, the motor housing 60 includes screw bosses 600. The screw bosses 600 are fastened to decks 200 on the housing 2. Each deck 200 has a through-hole 201. Each screw boss 600 has a threaded hole 601. The decks 200 on the housing 2 and the motor housing 60 are fastened together with screws 202. Each screw 202 is placed into the corresponding through-hole 201 from below the corresponding deck 200. Each screw 202 placed through the corresponding through-hole 201 has the distal end to be received in the corresponding threaded hole 601 in the screw boss 600. Threads on the screws 202 are engaged with threaded grooves on the threaded holes 601 to fasten the decks 200 on the housing 2 and the motor housing 60 together.

The motor housing 60 includes screw bosses 602. The screw bosses 602 are fixed to a baffle 203. The baffle 203 changes airflow inside the motor housing 60. The baffle 203 faces the lower surface of the motor housing 60. The baffle 203 has an opening 203A in its center. The rotor shaft 20 is placed in the opening 203A.

The baffle 203 has through-holes 204. Each screw boss 602 has a threaded hole 603. The baffle 203 and the motor housing 60 are fastened together with screws 205. The screws 205 are placed into the corresponding through-holes 204 from below the baffle 203. Each screw 205 placed through the corresponding through-hole 204 has the distal end to be received in the corresponding threaded hole 603 in the screw boss 602. Threads on the screws 205 are engaged with threaded grooves on the threaded holes 603 to fasten the baffle 203 and the motor housing 60 together.

Sensor Board

Figure 9:
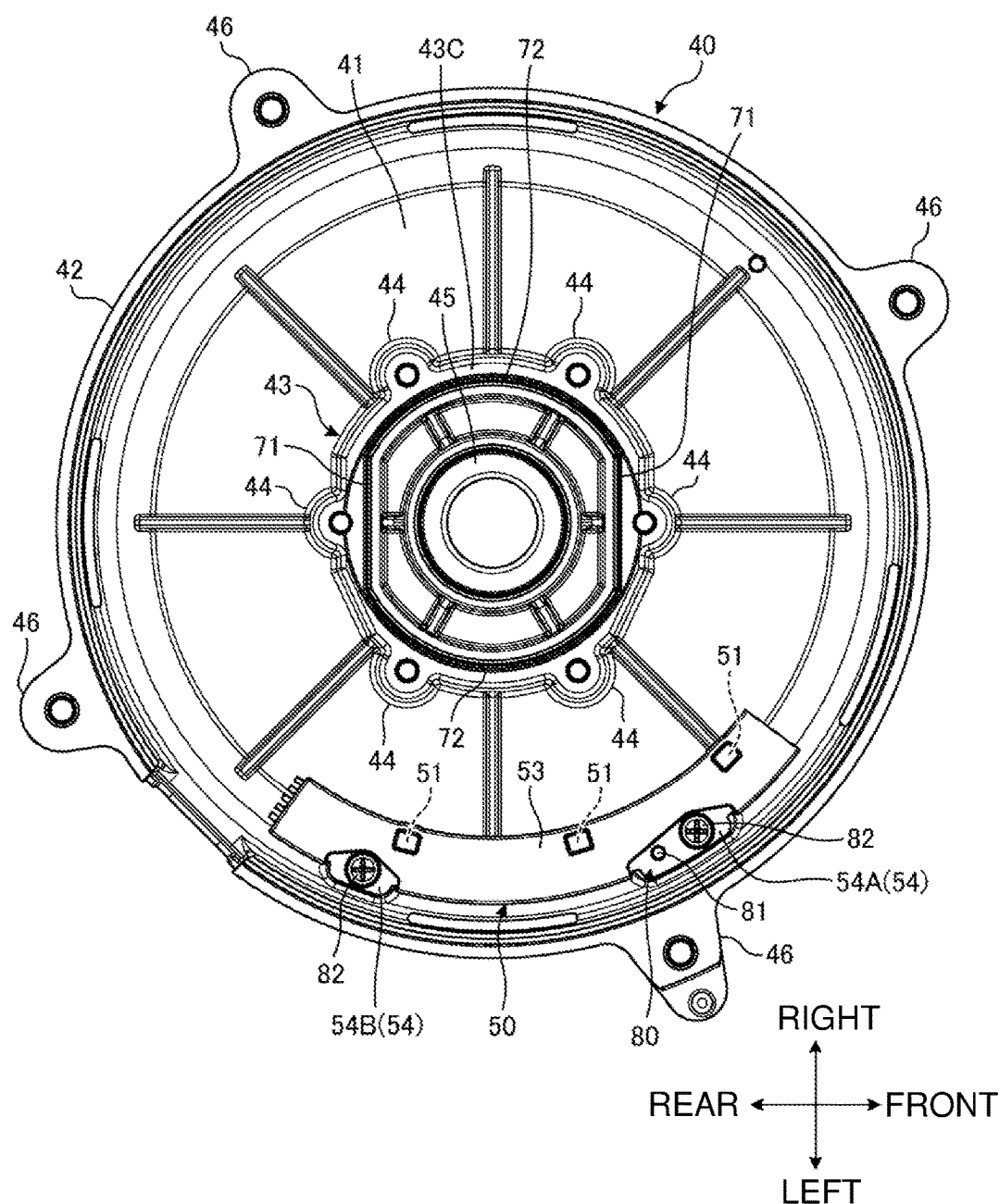
FIG. 9 is a bottom view of a stator base and a sensor board in the embodiment.
Figure 10:
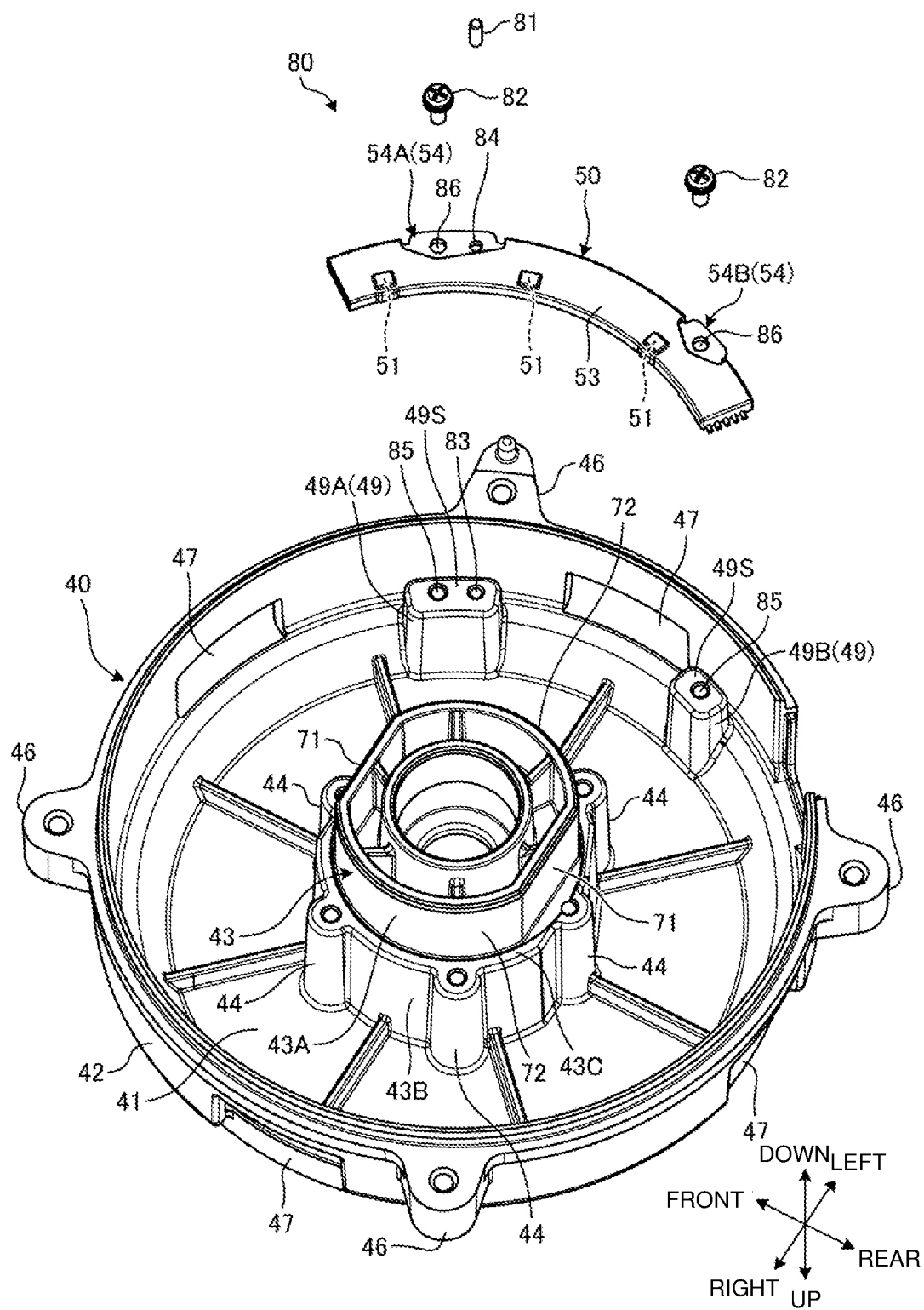
FIG. 10 is an exploded perspective view of the stator base and the sensor board in the embodiment as viewed from below.

FIG. 9 is a bottom view of the stator base 40 and the sensor board 50 in the embodiment. FIG. 10 is an exploded perspective view of the stator base 40 and the sensor board 50 in the embodiment as viewed from below.

The sensor board 50 is substantially arc-shaped. The sensor board 50 includes a circuit board 52 and a resin layer 53. The resin layer 53 at least partially covers a surface of the circuit board 52. The circuit board 52 includes a printed circuit board (PCB). The circuit board 52 has an upper surface and a lower surface. The magnetic sensors 51 are located on the lower surface of the circuit board 52.

In the embodiment, the resin layer 53 at least partially covers the magnetic sensors 51 and the surface of the circuit board 52. The resin layer 53 at least partially covers the upper surface of the circuit board 52. The resin layer 53 at least partially covers the lower surface of the circuit board 52. The surfaces of the circuit board 52 receive multiple electronic components in addition to the magnetic sensors 51. Examples of the electronic components mountable on the surfaces of the circuit board 52 include capacitors, resistors, and thermistors. The resin layer 53 also covers these electronic components.

The sensor board 50 is supported by the stator base 40. The sensor board 50 is fixed to the stator base 40. The stator base 40 includes bases 49. The base 49 is located inside the peripheral wall 42. The base 49 protrudes downward from the plate 41.

The stator base 40 includes multiple (two in the embodiment) bases 49. Each base 49 includes a base 49A, and a base 49B.

The sensor board 50 is supported by the bases 49. The sensor board 50 in contact with the bases 49 is fastened to the bases 49.

Each of the bases 49 has a support surface 49S facing the upper surface of the sensor board 50. Each support surface 49S faces downward. The sensor board 50 includes support areas 54 each supported by the corresponding base 49. Each of the support areas 54 is defined on the surface of the circuit board 52. No resin layer 53 is located on the support areas 54. The sensor board 50 is fastened to the bases 49 with the upper surface of each support area 54 in contact with the corresponding support surface 49S of the base 49.

The support areas 54 include a support area 54A and a support area 54B. The support area 54A is supported by the base 49A. The support area 54B is supported by the base 49B.

The motor 4 includes a board positioner 80 for positioning the stator base 40 and the sensor board 50. The board positioner 80 includes pins 81 and screws 82.

The bases 49 in the stator base 40 each have a base pin hole 83. The support areas 54 in the sensor board 50 each have a board pin hole 84. The pin 81 is placed into both the base pin hole 83 and the board pin hole 84.

The board positioner 80 in the embodiment includes one pin 81. The board positioner 80 may include two or more pins 81 located circumferentially at intervals.

The base 49A has one base pin hole 83. The support area 54A has one board pin hole 84.

The pins 81 are press-fitted into the corresponding base pin holes 83. Thus, the pins 81 are fixed to the bases 49. The pins 81 press-fitted into the corresponding base pin holes 83 are subsequently received in the corresponding board pin holes 84.

The bases 49 in the stator base 40 each have a base threaded hole 85. The support areas 54 in the sensor board 50 each have a board threaded opening 86. Each screw 82 is placed through the corresponding board threaded opening 86 and is received in the corresponding base threaded hole 85 in the stator base 40. Thus, the bases 49 and the sensor board 50 are fastened together with the screws 82.

The board positioner 80 includes at least two (two in the embodiment) screws 82 located circumferentially at intervals.

The base 49A and the base 49B each include one base threaded hole 85. The support area 54A and the support area 54B each include one board threaded opening 86.

Rotor and Stator

Figure 11:
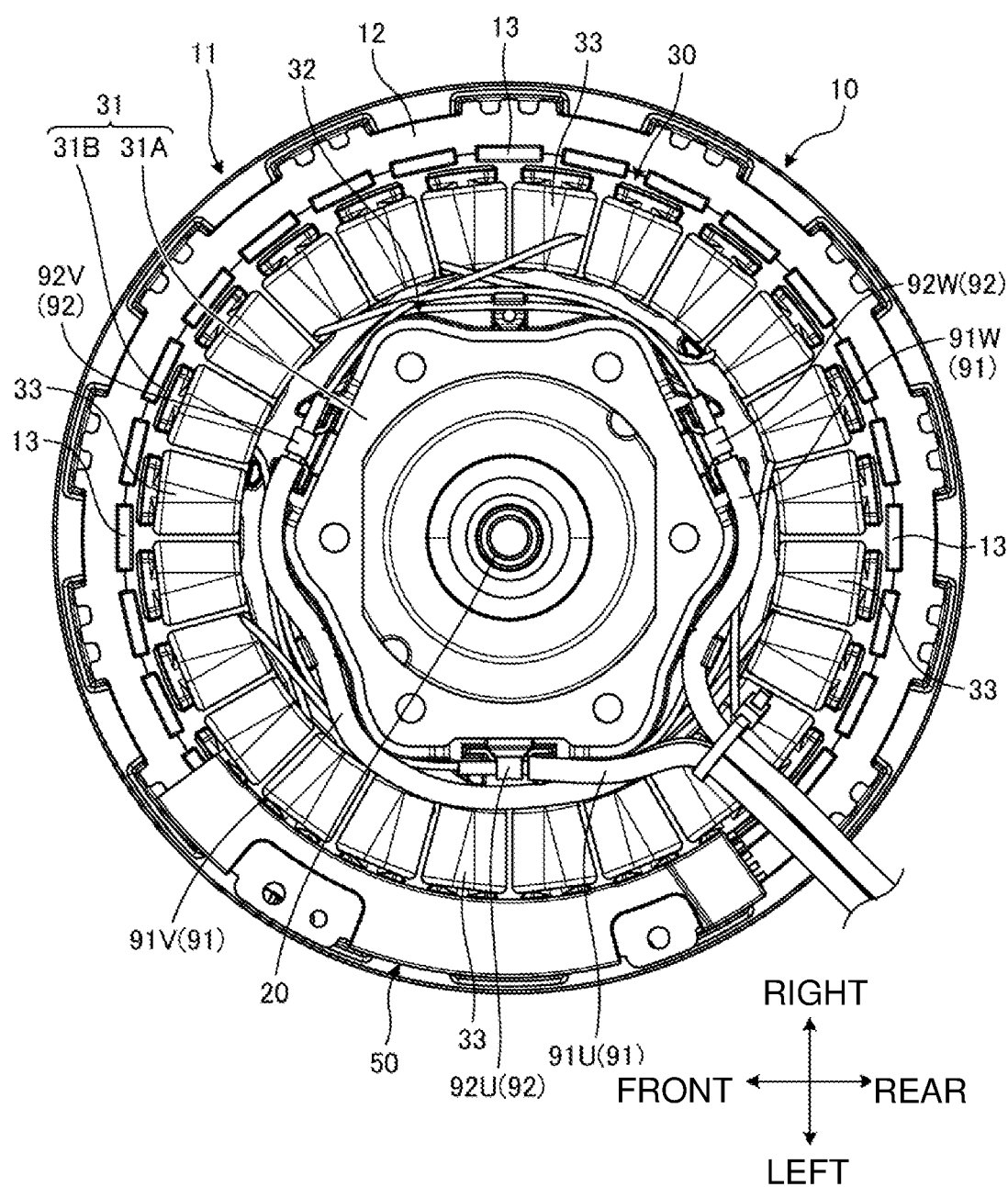
FIG. 11 is a top view of a rotor and a stator in the embodiment.
Figure 12:
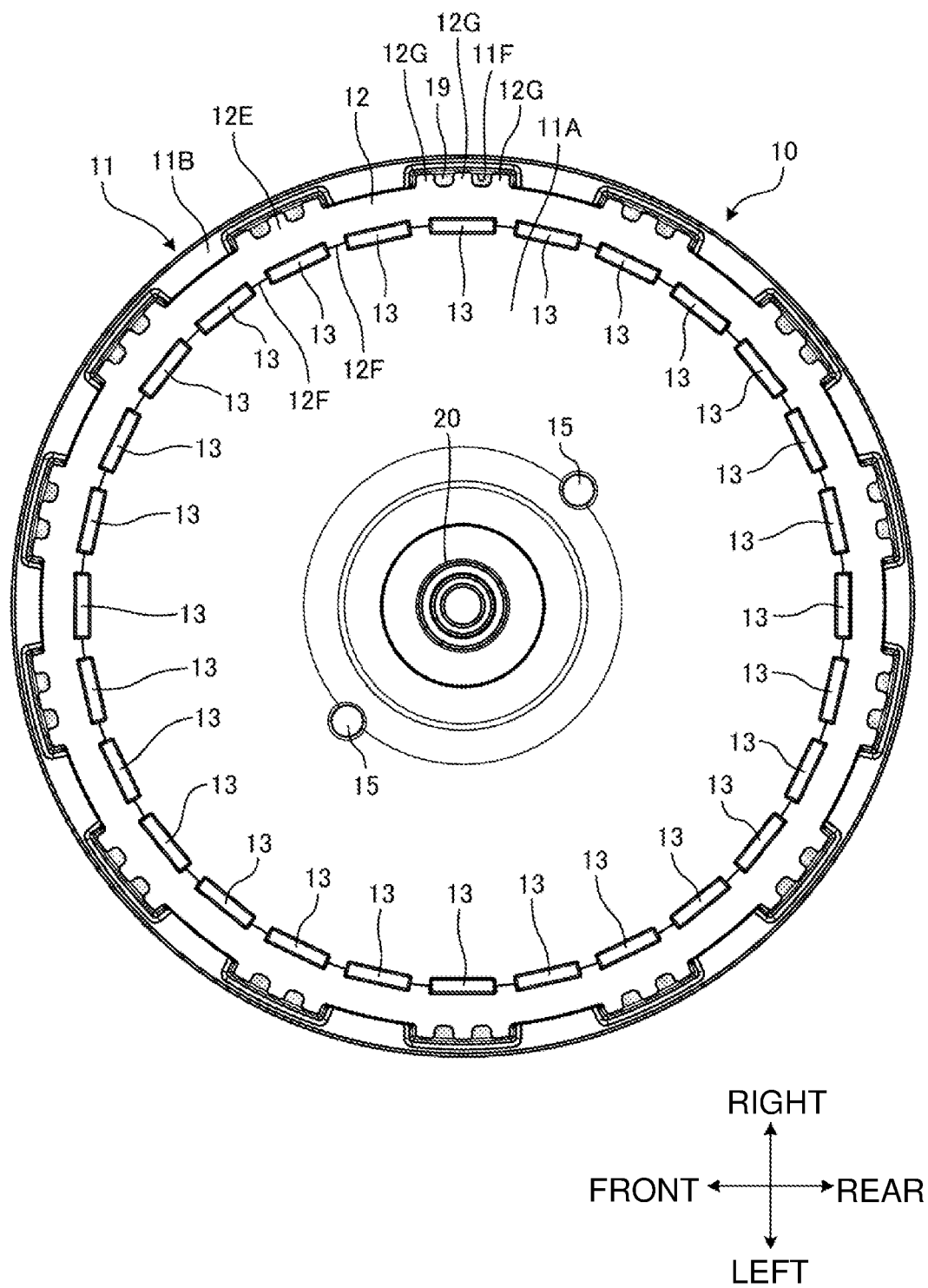
FIG. 12 is a top view of a rotor in the embodiment.
Figure 13:
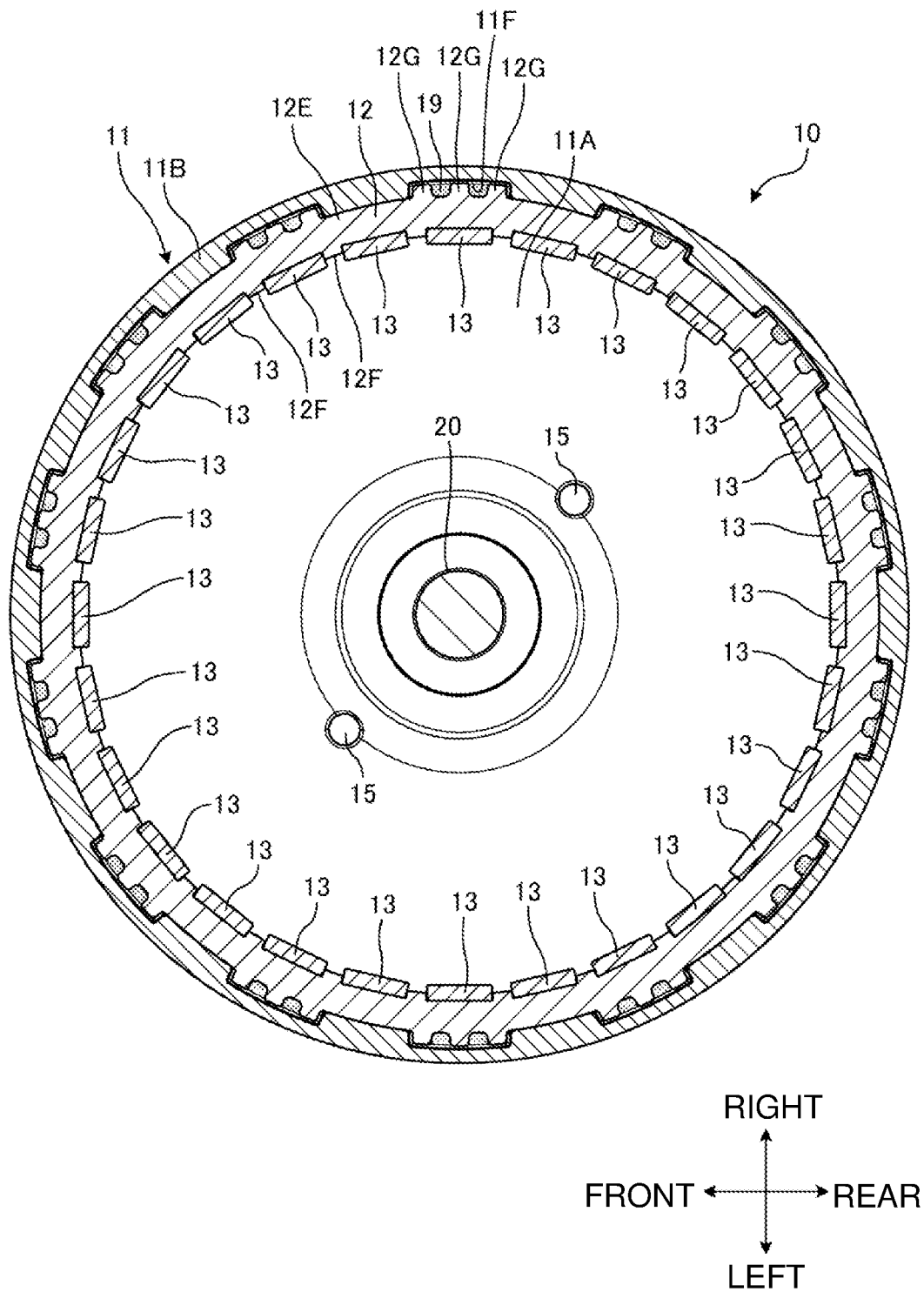
FIG. 13 is a cross-sectional view of the rotor in the embodiment.
Figure 14:
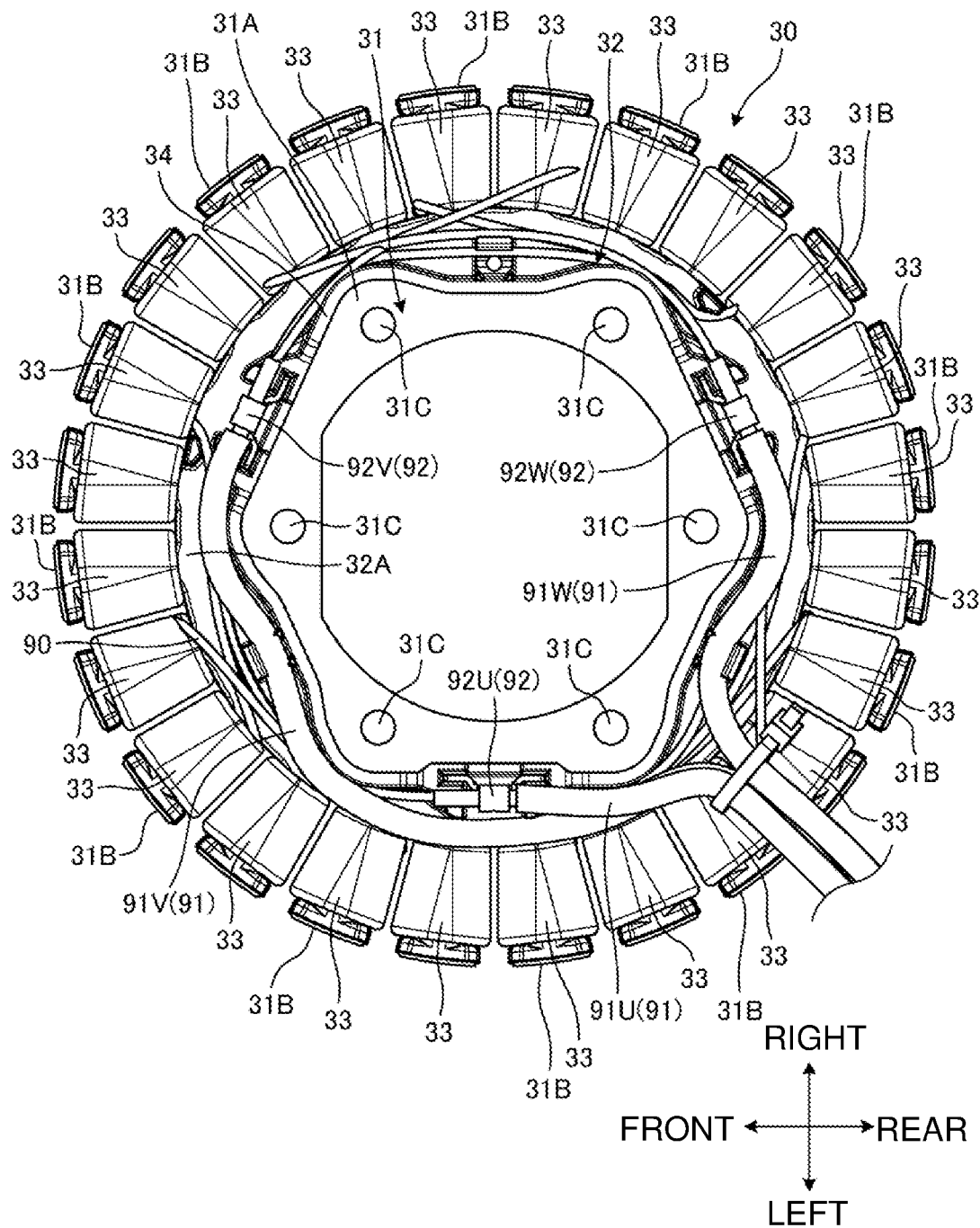
FIG. 14 is a top view of the stator in the embodiment.
Figure 15:
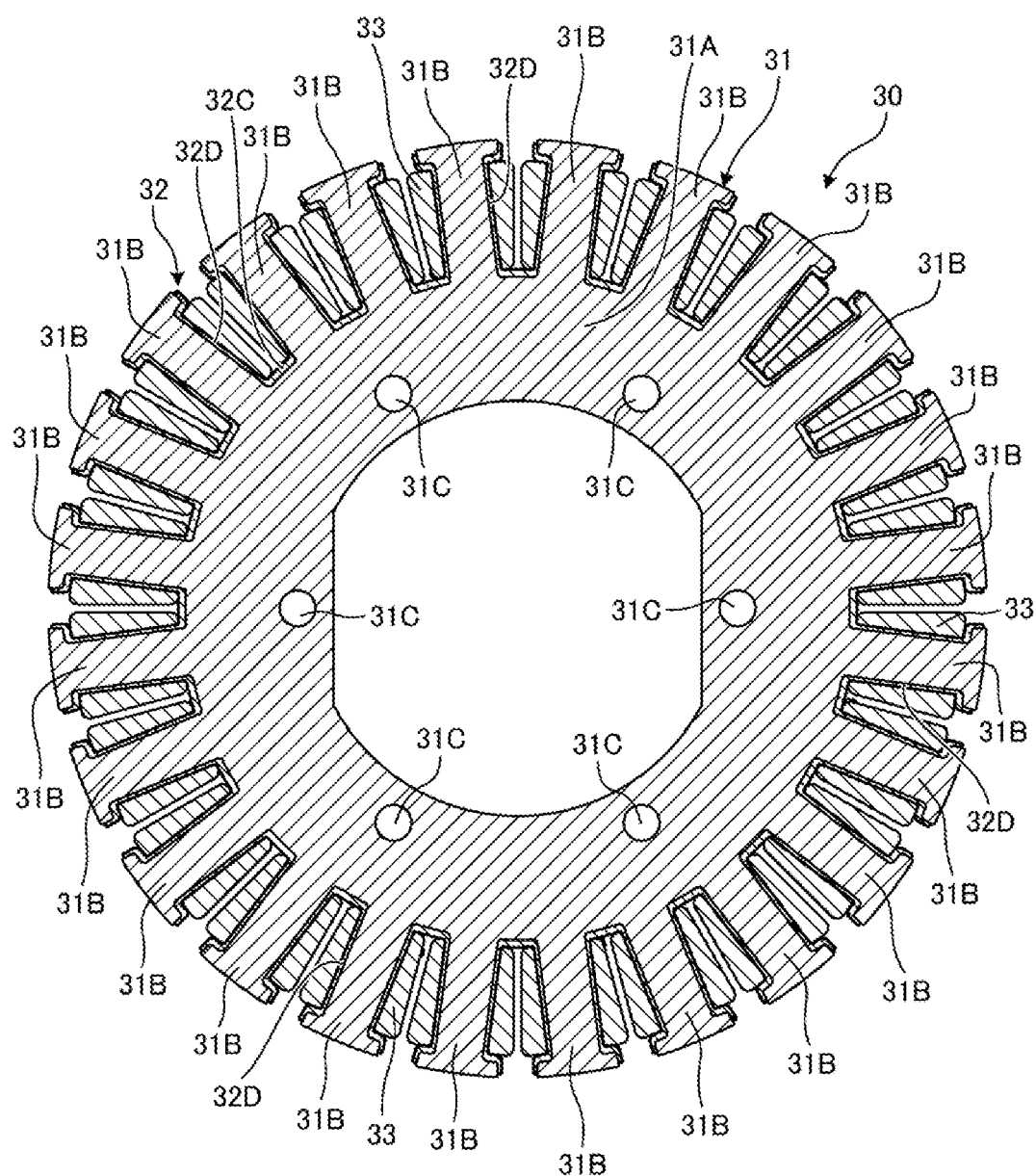
FIG. 15 is a cross-sectional view of the stator in the embodiment.

FIG. 11 is a top view of the rotor 10 and the stator 30 in the embodiment. FIG. 12 is a top view of the rotor 10 in the embodiment. FIG. 13 is a cross-sectional view of the rotor 10 in the embodiment. FIG. 14 is a top view of the stator 30 in the embodiment. FIG. 15 is a cross-sectional view of the stator 30 in the embodiment.

The rotor 10 includes the rotor cup 11, the rotor core 12, and the magnets 13. The rotor core 12 is held by the rotor cup 11. The magnet 13 is fixed to the inner circumferential surface of the rotor core 12.

The rotor cup 11 includes the plate 11A and the yoke 11B.

The rotor core 12 includes a ring 12E and inner protrusions 12F. The inner protrusions 12F protrude radially inward from the inner circumferential surface of the ring 12E. The inner protrusions 12F are located between the magnets 13 circumferentially adjacent to each other.

The ring 12E in the rotor core 12 has outer protrusions 12G on its outer circumferential surface. The outer protrusions 12G are in contact with the inner circumferential surface of the yoke 11B in the rotor cup 11. The rotor core 12 includes multiple outer protrusions 12G located circumferentially at intervals.

The rotor cup 11 has recesses 11F on its inner circumferential surface. Each recess 11F receives three outer protrusions 12G.

The multiple (three) outer protrusions 12G in the recess 11F receive an adhesive, which is filled between the outer protrusions 12G adjacent to each other. Thus, an adhesive layer 19 is located between the outer protrusions 12G adjacent to each other. The adhesive layer 19 fixes the rotor core 12 and the rotor cup 11 together.

As shown in FIG. 15, the insulator 32 includes an outer circumference cover 32C and a tooth cover 32D. The outer circumference cover 32C covers an outer circumferential surface of the yoke 31A facing radially outward. The tooth cover 32D covers surfaces of the teeth 31B around which the coils 33 are wound.

The multiple coils 33 include a wound single wire 90. The single wire 90 is sequentially wound around each of the teeth 31B with the tooth cover 32D between them. The wire 90 connects a first coil 33 and a second coil 33 wound after the first coil 33.

A driving current is supplied to the coils 33. The driving current is supplied to the coils 33 through the power lines 91 and fusing terminals 92. The driving current supplied to the coils 33 flows through the power lines 91 and the fusing terminals 92.

The power lines 91 and the fusing terminals 92 are each supported on the insulator 32. The power lines 91 and the fusing terminals 92 are each located above the upper end face of the stator core 31.

Each of the 24 coils 33 is assigned to one of a U- (UV-) phase, a V- (VW-) phase, and a W- (WU-) phase. The power lines 91 include a power line 91U, a power line 91V, and a power line 91W. A U-phase driving current flows through the power line 91U. A V-phase driving current flows through the power line 91V. A W-phase driving current flows through the power line 91W.

The fusing terminals 92 connect different portions of the wire 90 protruding from each of the multiple coils 33. The fusing terminals 92 include a fusing terminal 92U, a fusing terminal 92V, and a fusing terminal 92W. A U-phase driving current flows thorough the fusing terminal 92U. A V-phase driving current flows thorough the fusing terminal 92V. A W-phase driving current flows through the fusing terminal 92W.

The power line 91U is connected to the fusing terminal 92U. The power line 91V is connected to the fusing terminal 92V. The power line 91W is connected to the fusing terminal 92W.

Coil Structure

Figure 16:
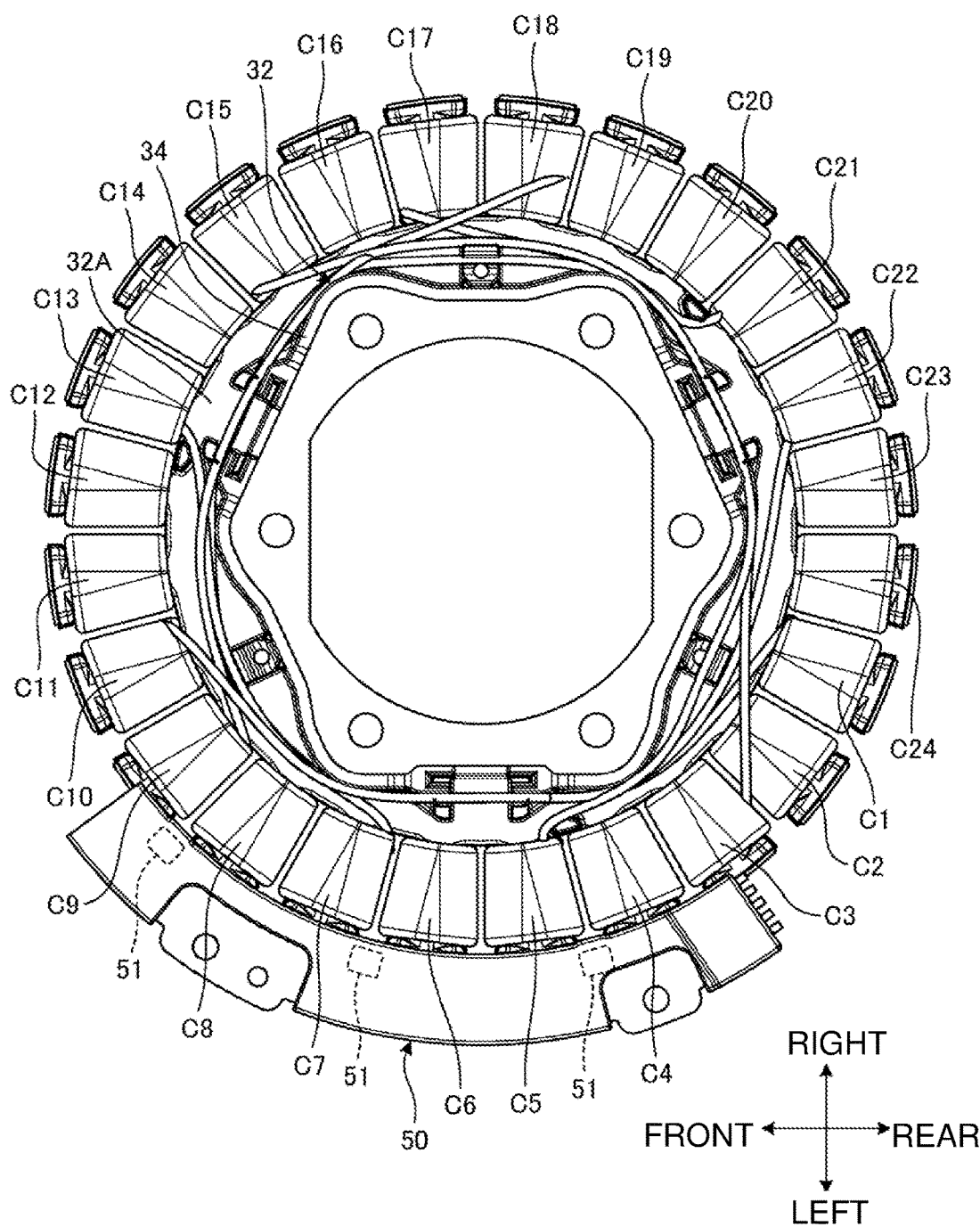
FIG. 16 is a top view of the stator in the embodiment.
Figure 17:
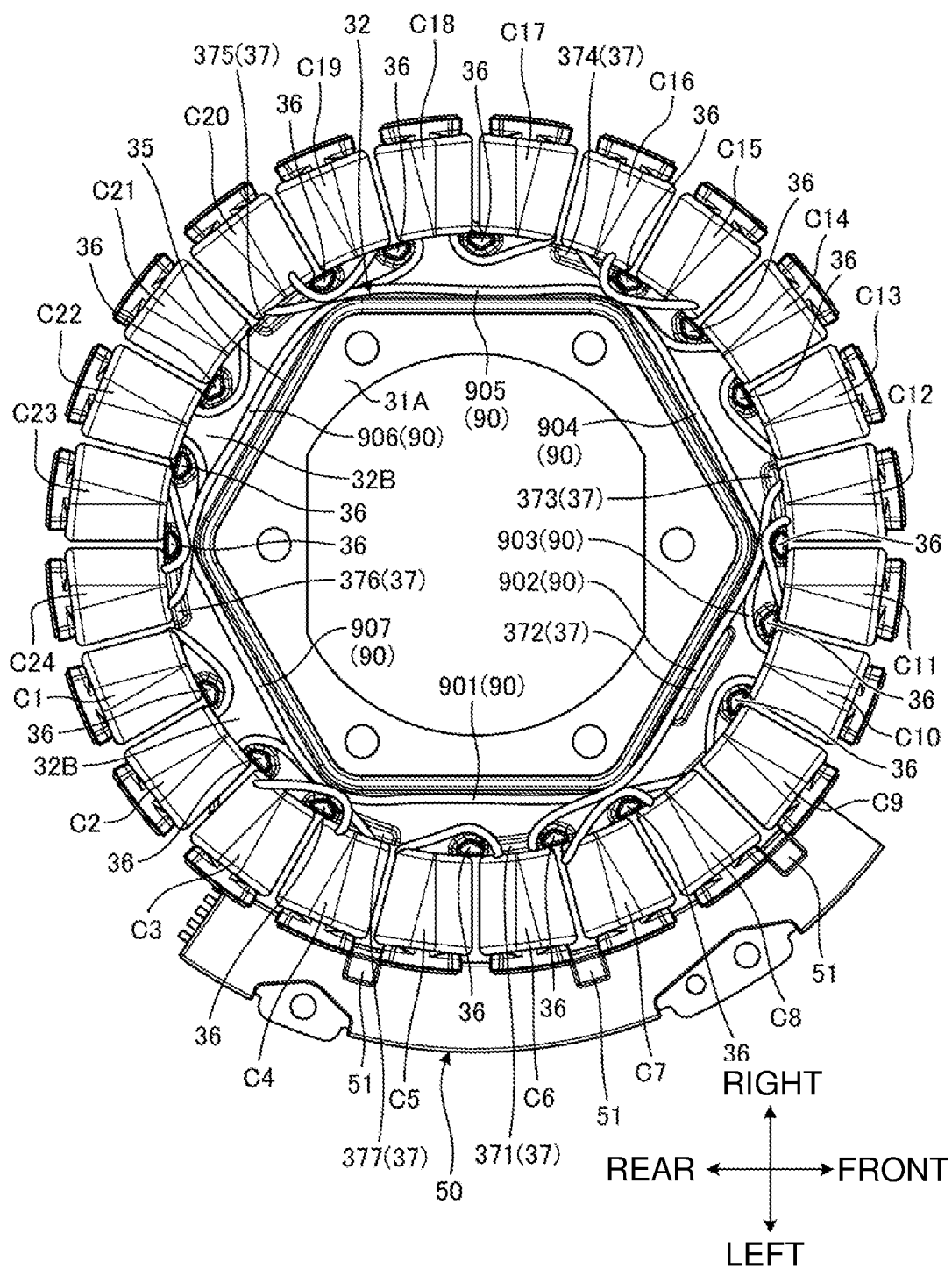
FIG. 17 is a bottom view of the stator in the embodiment.
Figure 18:
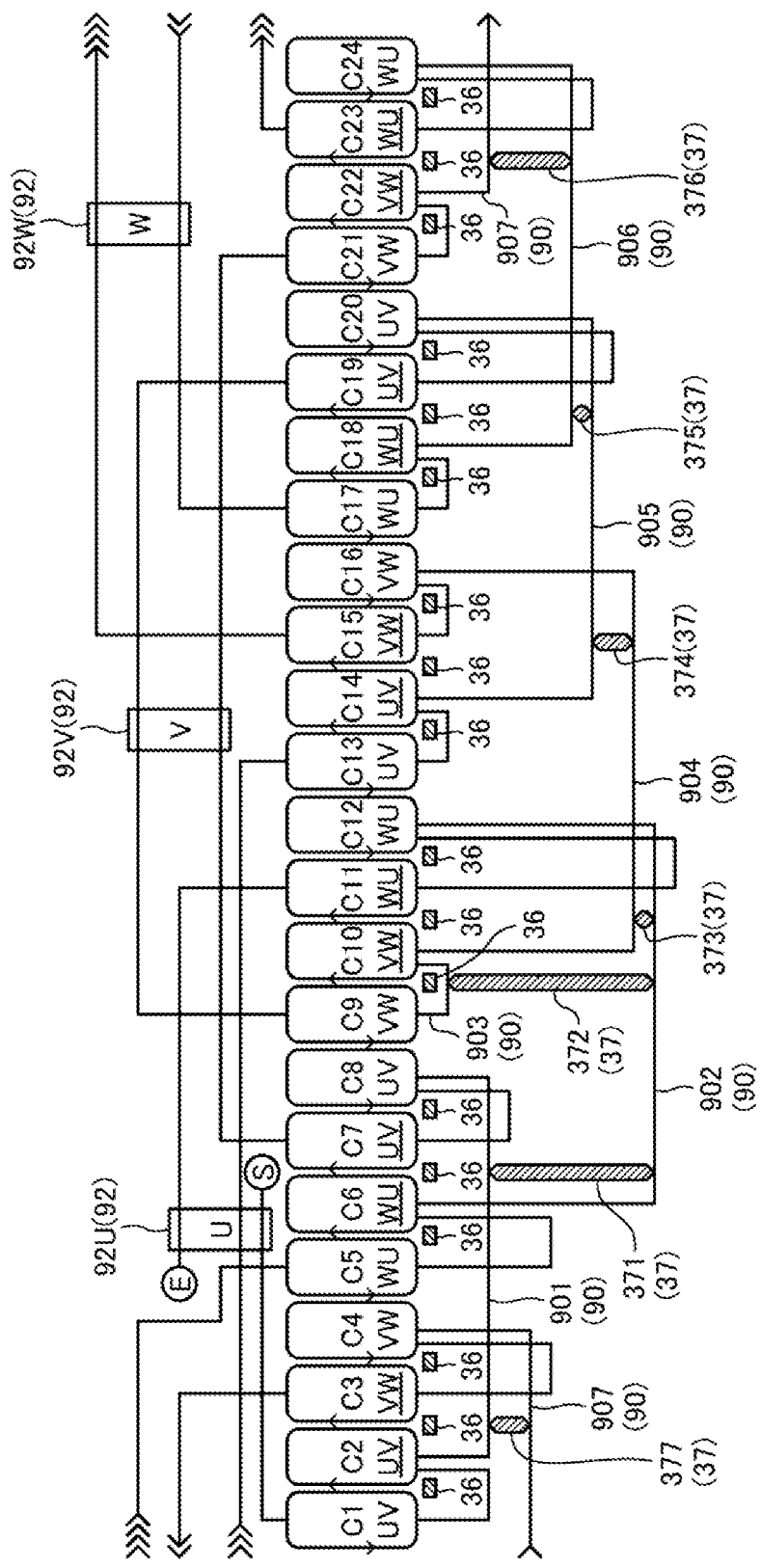
FIG. 18 is a schematic diagram of coils in the embodiment.

The structure of the coils 33 will now be described. FIG. 16 is a top view of the stator 30 in the embodiment. FIG. 17 is a bottom view of the stator 30 in the embodiment. FIG. 18 is a schematic diagram of the coils 33 in the embodiment.

As shown in FIGS. 16 and 17, the insulator 32 includes an upper end cover 32A and a lower end cover 32B. The upper end cover 32A covers a peripheral edge of the upper end face of the yoke 31A. The lower end cover 32B covers a peripheral edge of the lower end face of the yoke 31A.

The insulator 32 includes an upper peripheral wall 34, a lower peripheral wall 35, ribs 36, and protrusions 37.

The upper peripheral wall 34 surrounds the rotation axis AX. The upper peripheral wall 34 protrudes upward from the upper end cover 32A. The upper peripheral wall 34 is located radially inward from the coils 33.

The lower peripheral wall 35 surrounds the rotation axis AX. The lower peripheral wall 35 protrudes downward from the lower end cover 32B. The lower peripheral wall 35 is located radially inward from the coils 33.

The ribs 36 are located on the lower end cover 32B. The ribs 36 protrude downward from the lower end cover 32B. Multiple ribs 36 are located circumferentially at intervals. The multiple ribs 36 have the same height. The ribs 36 are fewer than the coils 33.

The protrusions 37 are located on the lower end cover 32B. The protrusions 37 are shorter than the ribs 36. The number of protrusions 37 is less than the number of ribs 36. The protrusions 37 are fewer than the coils 33.

Each rib 36 supports the wire 90 connecting the multiple coils 33. The wire 90 is placed on each rib 36. The wire 90 extends from radially inside the rib 36 and is placed on the corresponding rib 36. Each rib 36 supports the wire 90. The wire 90 thus extends from the lower end cover 32B and is placed into a space between the teeth 31B adjacent to each other. As described above, the teeth 31B adjacent to each other define a slot between them. Each rib 36 thus supports the wire 90 to allow the wire 90 extending from the lower end cover 32B to be placed into the slot. Each rib 36 guides the wire 90 from the lower end cover 32B to the lower end of the slot.

The wire 90 includes multiple portions located on the lower end cover 32B. The wire 90 includes overlapping portions. For example, the wire 90 includes a first portion connecting the first coil 33 and the second coil 33 on the lower end cover 32B. The wire 90 includes a second portion connecting a third coil 33 and a fourth coil 33 also on the lower end cover 32B. The second portion of the wire 90 at least partially overlaps the first portion of the wire 90. The protrusion 37 supports the second portion of the wire 90, and the first portion of the wire 90 is less likely to come in contact with the second portion of the wire 90.

When the second portion of the wire 90 is located partially covering the first portion of the wire 90, the protrusion 37 supports the second portion of the wire 90. The protrusion 37 has a support surface for supporting the second portion of the wire 90. The support surface of the protrusion 37 faces downward. The second portion of the wire 90 is at least partially located on the support surface of the protrusion 37.

As described above, the stator 30 in the embodiment includes the 24 coils 33. The 24 coils 33 are numbered C1 to C24 and will be described below. The coil C1 is adjacent to the coil C2 in the first circumferential direction. The coil C2 is adjacent to the coil C3 in the first circumferential direction. Similarly, the coils C4 through C24 are each adjacent to the coils C3 through C23 in the first circumferential direction. The coil C24 is adjacent to the coil C1 in the first circumferential direction.

The 24 coils 33 are formed by winding the single wire 90. As shown in FIG. 18, the wire 90 starts being wound at a winding start S. The wire 90 is wound sequentially around each of the teeth 31B to form the multiple coils 33 sequentially. The 24 coils 33 are formed by winding the wire 90, which is wound finally at a winding end E.

In the embodiment, some of the coils 33 are formed by winding the wire 90 in the forward direction (counterclockwise). Other coils 33 are formed by winding the wire 90 in the reversed direction (clockwise). The arrows in FIG. 18 indicate the winding direction of the wire 90. The coils C1, C4, C5, C8, C9, C12, C13, C16, C17, C20, C21, and C24 are formed by winding the wire 90 in the forward direction. The coils C2, C3, C6, C7, C10, C11, C14, C15, C18, C19, C22, and C23 are formed by winding the wire 90 in the reversed direction.

The coils C1, C2, C7, C8, C13, C14, C19, and C20 are assigned to the U- (UV-) phase. The coils C3, C4, C9, C10, C15, C16, C21, and C22 are assigned to the V- (VW-) phase. The coils C5, C6, C11, C12, C17, C18, C23, and C24 are assigned to the W- (WU-) phase.

In FIG. 18, the coils 33 with letters UV are assigned to the UV-phase and are formed by winding the wire 90 in the forward direction. The letters UV are underlined for the coils 33 formed by winding the wire 90 in the reversed direction.

The coils 33 with letters VW are assigned to the VW-phase and are formed by winding the wire 90 in the forward direction. The letters VW are underlined for the coils 33 formed by winding the wire 90 in the reversed direction.

The coils 33 with letters WU are assigned to the WU-phase and are formed by winding the wire 90 in the forward direction. The letters WU are underlined for the coils 33 formed by winding the wire 90 in the reversed direction.

In the embodiment, the coil C1 is formed first. The wire 90 wound in the forward direction to form the coil C1 is then pulled toward a non-connection position below the teeth 31B (near the lower end cover 32B). The wire 90 pulled to the non-connection position is placed on the corresponding rib 36 and wound to form the coil C2.

The wire 90 wound in the reversed direction to form the coil C2 is then pulled toward the non-connection position, placed on the corresponding rib 36, and wound to form the coil C8. The wire 90 wound in the forward direction to form the coil C8 is then pulled toward the non-connection position, placed on the corresponding rib 36, and wound to form the coil C7. The wire 90 wound in the reversed direction to form the coil C7 is then pulled toward a connection position above the teeth 31B (near the upper end cover 32A).

The wire 90 pulled to the connection position is wound to form the coil C21. The wire 90 wound in the forward direction to form the coil C21 is then pulled toward the non-connection position, placed on the corresponding rib 36, and wound to form the coil C22.

The wire 90 wound in the reversed direction to form the coil C22 is then pulled toward the non-connection position, placed on the corresponding rib 36, and wound to form the coil C4. The wire 90 wound in the forward direction to form the coil C4 is then pulled toward the non-connection position, placed on the corresponding rib 36, and wound to form the coil C3. The wire 90 wound in the reversed direction to form the coil C3 is then pulled toward the connection position.

The wire 90 pulled to the connection position is wound to form the coil C17. The wire 90 wound in the forward direction to form the coil C17 is then pulled toward the non-connection position, placed on the corresponding rib 36, and wound to form the coil C18.

The wire 90 wound in the reversed direction to form the coil C18 is then pulled toward the non-connection position, placed on the corresponding rib 36, and wound to form the coil C24. The wire 90 wound in the forward direction to form the coil C24 is then pulled toward the non-connection position, placed on the corresponding rib 36, and wound to form the coil C23. The wire 90 wound in the reversed direction to form the coil C23 is then pulled toward the connection position.

The wire 90 pulled to the connection position is wound to form the coil C13. The wire 90 wound in the forward direction to form the coil C13 is then pulled toward the non-connection position, placed on the corresponding rib 36, and wound to form the coil C14.

The wire 90 wound in the reversed direction to form the coil C14 is then pulled toward the non-connection position, placed on the corresponding rib 36, and wound to form the coil C20. The wire 90 wound in the forward direction to form the coil C20 is then pulled toward the non-connection position, placed on the corresponding rib 36, and wound to form the coil C19. The wire 90 wound in the reversed direction to form the coil C19 is then pulled toward the connection position.

The wire 90 pulled to the connection position is wound to form the coil C9. The wire 90 wound in the forward direction to form the coil C9 is then pulled toward the non-connection position, placed on the corresponding rib 36, and wound to form the coil C10.

The wire 90 wound in the reversed direction to form the coil C10 is then pulled toward the non-connection position, placed on the corresponding rib 36, and wound to form the coil C16. The wire 90 wound in the forward direction to form the coil C16 is then pulled toward the non-connection position, placed on the corresponding rib 36, and wound to form the coil C15. The wire 90 wound in the reversed direction to form the coil C15 is then pulled toward the connection position.

The wire 90 pulled to the connection position is wound to form the coil C5. The wire 90 wound in the forward direction to form the coil C5 is then pulled toward the non-connection position, placed on the corresponding rib 36, and wound to form the coil C6.

The wire 90 wound in the reversed direction to form the coil C6 is then pulled toward the non-connection position, placed on the corresponding rib 36, and wound to form the coil C12. The wire 90 wound in the forward direction to form the coil C12 is then pulled toward the non-connection position, placed on the corresponding rib 36, and wound to form the coil C11. The wire 90 wound in the reversed direction to form the coil C11 is then pulled toward the connection position.

This completes the 24 coils 33.

The wire 90 located on the connection position includes a portion between the winding start S and the coil C1 and a portion between the coil C11 and the winding end E. These portions of the wire 90 are each connected to the fusing terminal 92U.

The wire 90 located on the connection position includes a portion between the coil C7 and the coil C21 and a portion between the coil C19 and the coil C9. These portions of the wire 90 are each connected to the fusing terminal 92V.

The wire 90 located on the connection position includes a portion between the coil C3 and the coil C17 and a portion between the coil C15 and the coil C5. These portions of the wire 90 are each connected to the fusing terminal 92W.

As shown in FIGS. 17 and 18, the wire 90 includes multiple portions located on the non-connection position or the lower end cover 32B. The portions of the wire 90 located on the non-connection position include a wire 901 connecting the coil C2 to the coil C8, a wire 902 connecting the coil C6 to the coil C12, a wire 903 connecting the coil C9 to the coil C10, a wire 904 connecting the coil C10 to the coil C16, a wire 905 connecting the coil C14 to the coil C20, a wire 906 connecting the coil C18 to the coil C24, and a wire 907 connecting the coil C22 to the coil C4.

The wire 90 includes overlapping portions on the lower end cover 32B at the non-connection position. With the protrusions 37, a pair of overlapping portions of the wire 90 are less likely to come in contact with each other. The protrusions 37 in the embodiment include a protrusion 371, a protrusion 372, a protrusion 373, a protrusion 374, a protrusion 375, a protrusion 376, and a protrusion 377.

As shown in FIGS. 17 and 18, the wire 902 overlaps at least a part of the wire 901. The protrusion 371 supports the wire 902. Thus, the wire 901 is less likely to come in contact with the wire 902. The wire 902 on the protrusion 371 is lifted above the wire 901. Thus, the wire 901 is less likely to come in contact with the wire 902.

The wire 902 overlaps at least a part of the wire 903. The protrusion 372 supports the wire 902. Thus, the wire 903 is less likely to come in contact with the wire 902. The wire 902 on the protrusion 372 is lifted above the wire 903. Thus, the wire 903 is less likely to come in contact with the wire 902.

The wire 902 overlaps at least a part of the wire 904. The protrusion 373 supports the wire 902. Thus, the wire 904 is less likely to come in contact with the wire 902. The wire 902 on the protrusion 373 is lifted above the wire 904. Thus, the wire 904 is less likely to come in contact with the wire 902.

The wire 904 overlaps at least a part of the wire 905. The protrusion 374 supports the wire 904. Thus, the wire 905 is less likely to come in contact with the wire 904. The wire 904 on the protrusion 374 is lifted above the wire 905. Thus, the wire 905 is less likely to come in contact with the wire 904.

The wire 905 overlaps at least a part of the wire 906. The protrusion 375 supports the wire 905. Thus, the wire 906 is less likely to come in contact with the wire 905. The wire 905 on the protrusion 375 is lifted above the wire 906. Thus, the wire 906 is less likely to come in contact with the wire 905.

The wire 906 overlaps at least a part of the wire 907. The protrusion 376 supports the wire 906. Thus, the wire 907 is less likely to come in contact with the wire 906. The wire 906 on the protrusion 376 is lifted above the wire 907. Thus, the wire 907 is less likely to come in contact with the wire 906.

The wire 907 overlaps at least a part of the wire 901. The protrusion 377 supports the wire 907. Thus, the wire 901 is less likely to come in contact with the wire 907. The wire 907 on the protrusion 377 is lifted above the wire 901. Thus, the wire 901 is less likely to come in contact with the wire 907.

Controller

Figure 19:
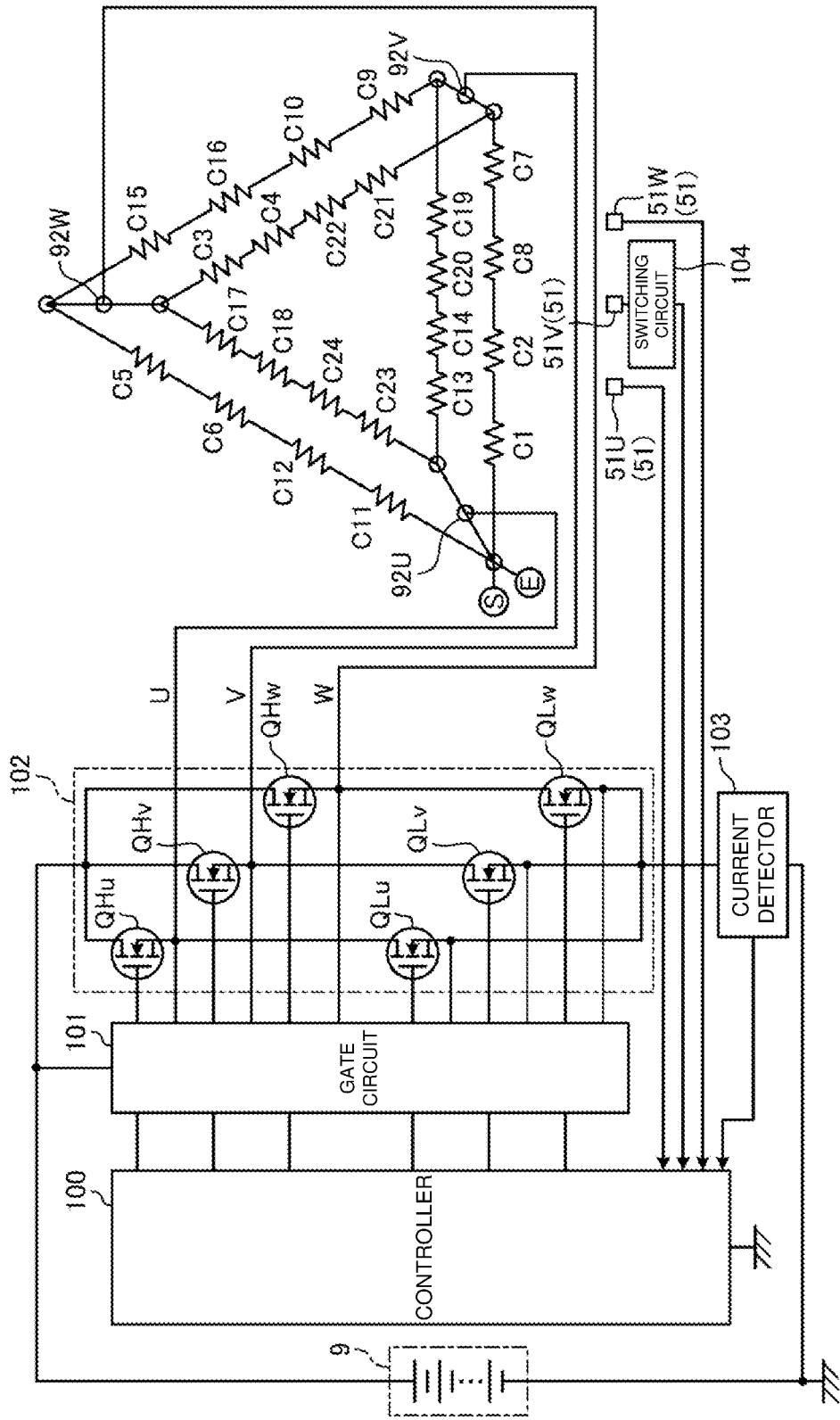
FIG. 19 is a schematic diagram of the electric work machine according to the embodiment.

FIG. 19 is a schematic diagram of the electric work machine 1 according to the embodiment. As shown in FIG. 19, the coils 33 are delta-connected. The coils C1, C2, C8, C7, C13, C14, C20, and C19 are assigned to the U- (UV-) phase. The coils C9, C10, C16, C15, C21, C22, C4, and C3 are assigned to the V- (VW-) phase. The coils C5, C6, C12, C11, C17, C18, C24, and C23 are assigned to the W- (WU-) phase.

The coils C1, C2, C8, and C7 are connected in series. The coils C13, C14, C20, and C19 are connected in series. The coils C1, C2, C8, and C7 are connected to the coils C13, C14, C20, and C19 in parallel.

The coils C9, C10, C16, and C15 are connected in series. The coils C21, C22, C4, and C3 are connected in series. The coils C9, C10, C16, and C15 are connected to the coils C21, C22, C4, and C3 in parallel.

The coils C5, C6, C12, and C11 are connected in series. The coils C17, C18, C24, and C23 are connected in series. The coils C5, C6, C12, and C11 are connected to the coils C17, C18, C24, and C23 in parallel.

In other words, the 24 coils 33 are arranged with two strings of coils 33 connected in parallel, each string including four coils 33 connected in series. The strings are delta-connected.

The electric work machine 1 includes a controller 100, a gate circuit 101, an inverter 102, a current detector 103, and a switching circuit 104.

The controller 100 includes a circuit board on which multiple electronic components are mounted. Examples of the electronic components mountable on the circuit board include a processor such as a central processing unit (CPU), a nonvolatile memory such as a read-only memory (ROM) or a storage device, and a volatile memory such as a random-access memory (RAM).

The inverter 102 supplies a driving current to the coils 33 in accordance with the power supplied from the battery pack 9. The inverter 102 includes six switching elements QHu, QHv, QHw, QLu, QLv, and QLw. Each of the switching elements QHu, QHv, QHw, QLu, QLv, and QLw includes a field-effect transistor (FET).

The switching element QHu is located between the fusing terminal 92U and the power line connected to the positive terminal of the battery pack 9. The switching element QHv is located between the fusing terminal 92V and the power line connected to the positive terminal of the battery pack 9. The switching element QHw is located between the fusing terminal 92W and the power line connected to the positive terminal of the battery pack 9.

Turning on the switching element QHu electrically connects the fusing terminal 92U and the power line. Turning on the switching element QHv electrically connects the fusing terminal 92V and the power line. Turning on the switching element QHw electrically connects the fusing terminal 92W and the power line.

The switching element QLu is located between the fusing terminal 92U and the ground line connected to the negative terminal of the battery pack 9. The switching element QLv is located between the fusing terminal 92V and the ground line connected to the negative terminal of the battery pack 9. The switching element QLw is located between the fusing terminal 92W and the ground line connected to the negative terminal of the battery pack 9.

Turning on the switching element QLu electrically connects the fusing terminal 92U and the ground line. Turning on the switching element QLv electrically connects the fusing terminal 92V and the ground line. Turning on the switching element QLw electrically connects the fusing terminal 92W and the ground line.

The gate circuit 101 drives the switching elements QHu, QHv, QHw, QLu, QLv, and QLw. The controller 100 outputs control signals to the gate circuit 101 to drive the switching elements QHu, QHv, QHw, QLu, QLv, and QLw in the inverter 102.

The current detector 103 is located on a current path from the inverter 102 to the negative terminal of the battery pack 9. The current detector 103 outputs a signal with a voltage corresponding to the current flowing through the current path. The controller 100 detects the driving current flowing through the coils 33 in response to output signals from the current detector 103.

The sensor board 50 includes three magnetic sensors 51. The magnetic sensors 51 include a magnetic sensor 51U, a magnetic sensor 51V, and a magnetic sensor 51W. The magnetic sensor 51U corresponds to the U- (UV-) phase. The magnetic sensor 51V corresponds to the V- (VW-) phase. The magnetic sensor 51W corresponds to the W- (WU-) phase.

The magnetic sensors 51 output detection signals to be input into the controller 100. The controller 100 controls the gate circuit 101 in response to detection signals from the respective magnetic sensors 51U, 51V, and 51W to supply a driving current to the respective U- (UV-) phase coils 33, the V- (VW-) phase coils 33, and the W- (WU-) phase coils 33.

The magnetic sensors 51U, 51V, and 51W each output a detection signal switchable between a high-level detection signal and a low-level detection signal at every 180 electrical degrees in accordance with a change in the magnetic field resulting from the rotation of the rotor 10. The switching circuit 104 inverts a high-level detection signal and a low-level detection signal to be input into the controller 100 from the magnetic sensor 51V.

Figure 20:
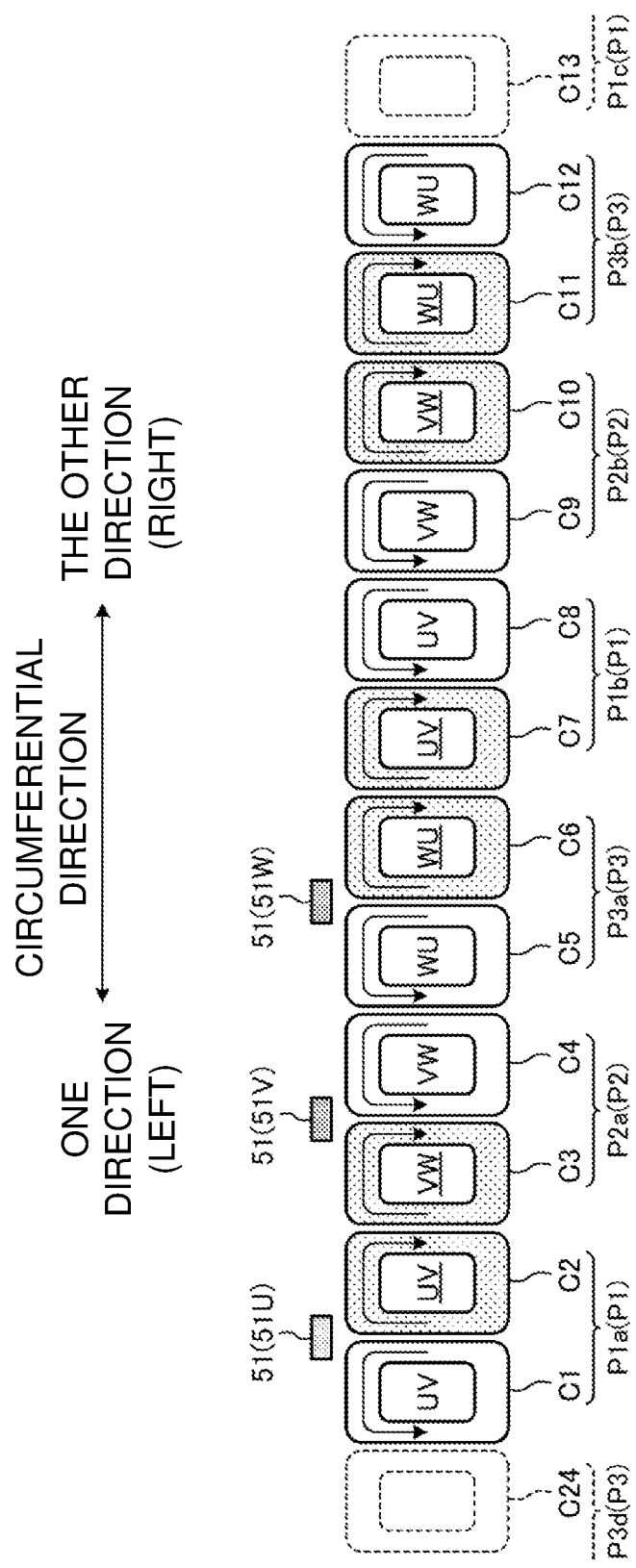
FIG. 20 is a schematic diagram of the coils in the embodiment.

FIG. 20 is a schematic diagram of the coils 33 in the embodiment. FIG. 20 is a diagram showing some of the 24 coils 33 shown in FIG. 18. FIG. 20 is a schematic diagram showing the relationship between the coils 33 and the magnetic sensors 51, different from the relationship between the coils 33 and the magnetic sensors 51 shown in FIGS. 16 and 17.

As described above, the coils 33 include the coils 33 assigned to the UV-phase, the coils 33 assigned to the VW-phase, and the coils 33 assigned to the WU-phase. In FIG. 20, the coils C1, C2, C7, and C8 are assigned to the UV-phase. The coils C3, C4, C9, and C10 are assigned to the VW-phase. The coils C5, C6, C11, and C12 are assigned to the WU-phase.

Two UV-phase coils 33 adjacent to each other are hereafter referred to as a first coil pair P1 for convenience. Two VW-phase coils 33 adjacent to each other are referred to as a second coil pair P2 for convenience. Two WU-phase coils 33 adjacent to each other are referred to as a third coil pair P3 for convenience.

In the example shown in FIG. 20, the first coil pairs P1 include a first coil pair P1a and a first coil pair P1b. The first coil pair P1a includes the coils C1 and C2. The first coil pair P1b includes the coils C7 and C8.

The second coil pairs P2 include a second coil pair P2a and a second coil pair P2b. The second coil pair P2a includes the coils C3 and C4. The second coil pair P2b includes the coils C9 and C10.

The third coil pairs P3 include a third coil pair P3a and a third coil pair P3b. The third coil pair P3a includes the coils C5 and C6. The third coil pair P3b includes the coils C11 and C12.

The two coils 33 in each first coil pair P1 are connected to each other in series and formed with the single wire 90. The two coils 33 in each second coil pair P2 are connected to each other in series and formed with the single wire 90.

The two coils 33 in each third coil pair P3 are connected to each other in series and formed with the single wire 90. In the embodiment, the coils 33 in the first coil pairs P1, the coils 33 in the second coil pairs P2, and the coils 33 in the third coil pairs P3 are formed by winding the single wire 90.

Each second coil pair P2a is adjacent in one circumferential direction to the corresponding third coil pair P3a. Each first coil pair P1a is adjacent in one circumferential direction to the second coil pair P2a. In FIG. 20, being in one circumferential direction (first circumferential direction) is being at the left, and being in the other circumferential direction (second circumferential direction) is being at the right for convenience.

The two coils in each first coil pair P1, or the left coil 33 and the right coil 33, are wound in different directions. The two coils 33 in each second coil pair P2, or the left coil 33 and the right coil 33, are wound in different directions. The two coils 33 in each third coil pair P3, or the left coil 33 and the right coil 33, are wound in different directions.

In the first coil pair P1a, for example, the left coil C1 is wound in the forward direction, and the right coil C2 is wound in the reversed direction. In the first coil pair P1b, the left coil C7 is wound in the reversed direction, and the right coil C8 is wound in the forward direction.

In the second coil pair P2a, for example, the left coil C3 is wound in the reversed direction, and the right coil C4 is wound in the forward direction. In the second coil pair P2b, the left coil C9 is wound in the forward direction, and the right coil C10 is wound in the reversed direction.

In the third coil pair P3a, for example, the left coil C5 is wound in the forward direction, and the right coil C6 is wound in the reversed direction. In the third coil pair P3b, the left coil C11 is wound in the reversed direction, and the right coil C12 is wound in the forward direction.

In the first coil pair P1 and the second coil pair P2 adjacent to each other, the right coil 33 (other circumferential direction) in the first coil pair P1 is wound in the same direction as the left coil 33 (one circumferential direction) in the second coil pair P2.

In the second coil pair P2 and the third coil pair P3 adjacent to each other, the right coil 33 (other circumferential direction) in the second coil pair P2 is wound in the same direction as the left coil 33 (one circumferential direction) in the third coil pair P3.

In the first coil pair P1a and the second coil pair P2a adjacent to each other, for example, the right coil C2 in the first coil pair P1a is wound in the reversed direction, and the left coil C3 in the second coil pair P2a is also wound in the reversed direction.

In the first coil pair P1b and the second coil pair P2b adjacent to each other, the right coil C8 in the first coil pair P1b is wound in the forward direction, and the left coil C9 in the second coil pair P2b is also wound in the forward direction.

In the second coil pair P2a and the third coil pair P3a adjacent to each other, for example, the right coil C4 in the second coil pair P2a is wound in the forward direction, and the left coil C5 in the third coil pair P3a is also wound in the forward direction.

In the second coil pair P2b and the third coil pair P3b adjacent to each other, the right coil C10 in the second coil pair P2b is wound in the reversed direction, and the left coil C11 in the third coil pair P3b is also wound in the reversed direction.

In the third coil pair P3d and the first coil pair P1a adjacent to each other, for example, the right coil C24 in the third coil pair P3d is wound in the forward direction, and the left coil C1 in the first coil pair P1a is also wound in the forward direction.

In the third coil pair P3b and the first coil pair P1c adjacent to each other, the right coil C12 in the third coil pair P3b is wound in the forward direction, and the left coil C13 in the first coil pair P1c is also wound in the forward direction.

In the circumferential direction, the magnetic sensor 51U is aligned with at least a portion of the first coil pair P1. The magnetic sensor 51V is aligned with at least a portion of the second coil pair P2. The magnetic sensor 51W is aligned with at least a portion of the third coil pair P3.

The distance between the magnetic sensors 51U and 51V is equal to the distance between the magnetic sensors 51V and 51W in the circumferential direction. In other words, the three magnetic sensors 51 are located at circumferentially equal intervals.

In the circumferential direction, the magnetic sensor 51U is located between the left coil C1 (one circumferential direction) and the right coil C2 (other circumferential direction) in the first coil pair P1a. The magnetic sensor 51V is located between the left coil C3 (one circumferential direction) and the right coil C4 (other circumferential direction) in the second coil pair P2a. The magnetic sensor 51W is located between the left coil C5 (one circumferential direction) and the right coil C6 (other circumferential direction) in the third coil pair P3a.

FIG. 21 is a table showing detection patterns of the magnetic sensors 51U, 51V, and 51W and driving patterns for the switching elements QHu, QHv, QHw, QLu, QLv, and QLw in the embodiment.

As shown in FIG. 21, the magnetic sensors 51U, 51V, and 51W output detection signals in six detection patterns Hp1, Hp2, Hp3, Hp4, Hp5, and Hp6. The switching elements QHu, QHv, QHw, QLu, QLv, and QLw are driven in six driving patterns Dp1, Dp2, Dp3, Dp4, Dp5, and Dp6.

In the driving pattern Dp1, the switching elements QHv and QLu are turned on.

Thus, the driving current flows through each of the coils 33 assigned to the UV-phase from the fusing terminal 92V to the fusing terminal 92U.

In the driving pattern Dp2, the switching elements QHw and QLu are turned on. Thus, the driving current flows through each of the coils 33 assigned to the WU-phase from the fusing terminal 92W to the fusing terminal 92U.

In the driving pattern Dp3, the switching elements QHw and QLv are turned on. Thus, the driving current flows through each of the coils 33 assigned to the VW-phase from the fusing terminal 92W to the fusing terminal 92V.

In the driving pattern Dp4, the switching elements QHu and QLv are turned on.

Thus, the driving current flows through each of the coils 33 assigned to the UV-phase from the fusing terminal 92U to the fusing terminal 92V.

In the driving pattern Dp5, the switching elements QHu and QLw are turned on. Thus, the driving current flows through each of the coils 33 assigned to the WU-phase from the fusing terminal 92U to the fusing terminal 92W.

In the driving pattern Dp6, the switching elements QHv and QLw are turned on. Thus, the driving current flows through each of the coils 33 assigned to the VW-phase from the fusing terminal 92V to the fusing terminal 92W.

The six driving patterns Dp1 to Dp6 are repeated sequentially to generate a rotating magnetic field in the motor 4, thus rotating the rotor 10.

When the magnetic sensors 51U, 51V, and 51W output detection signals shown in the detection pattern Hp1, a driving current is supplied to the coils 33 in the driving pattern Dp1. Similarly, when the magnetic sensors 51U, 51V, and 51W output detection signals shown in one of the detection patterns Hp2, Hp3, Hp4, Hp5, and Hp6, a driving current is supplied to the coils 33 in the corresponding one of the driving patterns Dp2, Dp3, Dp4, Dp5, and Dp6. As the detection pattern of the detection signal output from each of the magnetic sensors 51U, 51V, and 51W changes sequentially, a driving current is supplied to the coils 33 in the driving pattern changing sequentially in response to the detection pattern of the detection signal.

In the detection pattern Hp1, the detection signal HAu from the magnetic sensor 51U is at a high level, the detection signal HAv from the magnetic sensor 51V is at a high level, and the detection signal HAw from the magnetic sensor 51W is at a high level.

In the detection pattern Hp2, the detection signal HAu from the magnetic sensor 51U is at a high level, the detection signal HAv from the magnetic sensor 51V is at a high level, and the detection signal HAw from the magnetic sensor 51W is at a low level.

In the detection pattern Hp3, the detection signal HAu from the magnetic sensor 51U is at a high level, the detection signal HAv from the magnetic sensor 51V is at a low level, and the detection signal HAw from the magnetic sensor 51W is at a low level.

In the detection pattern Hp4, the detection signal HAu from the magnetic sensor 51U is at a low level, the detection signal HAv from the magnetic sensor 51V is at a low level, and the detection signal HAw from the magnetic sensor 51W is at a low level.

In the detection pattern Hp5, the detection signal HAu from the magnetic sensor 51U is at a low level, the detection signal HAv from the magnetic sensor 51V is at a low level, and the detection signal HAw from the magnetic sensor 51W is at a high level.

In the detection pattern Hp6, the detection signal HAu from the magnetic sensor 51U is at a low level, the detection signal HAv from the magnetic sensor 51V is at a high level, and the detection signal HAw from the magnetic sensor 51W is at a high level.

FIG. 22 is a table showing the detection patterns of the magnetic sensors 51U, 51V, and 51W and the driving patterns for the switching elements QHu, QHv, QHw, QLu, QLv, and QLw in the embodiment.

In the example shown in FIG. 21, the magnetic sensors 51U and 51W are under the magnetic field in a different direction from the magnetic field received by the magnetic sensor 51V. In the example shown in FIG. 22, the switching circuit 104 inverts the high-level detection signal and the low-level detection signal to be input into the controller 100 from the magnetic sensor 51V. With the switching circuit 104, as shown in FIG. 22, the detection signal HAv from the magnetic sensor 51V is at a low level in the detection pattern Hp1. The detection signal HAv from the magnetic sensor 51V is at a low level in the detection pattern Hp2, at a high level in the detection pattern Hp3, at a high level in the detection pattern Hp4, at a high level in the detection pattern Hp5, and at a low level in the detection pattern Hp6.

Figure 23:
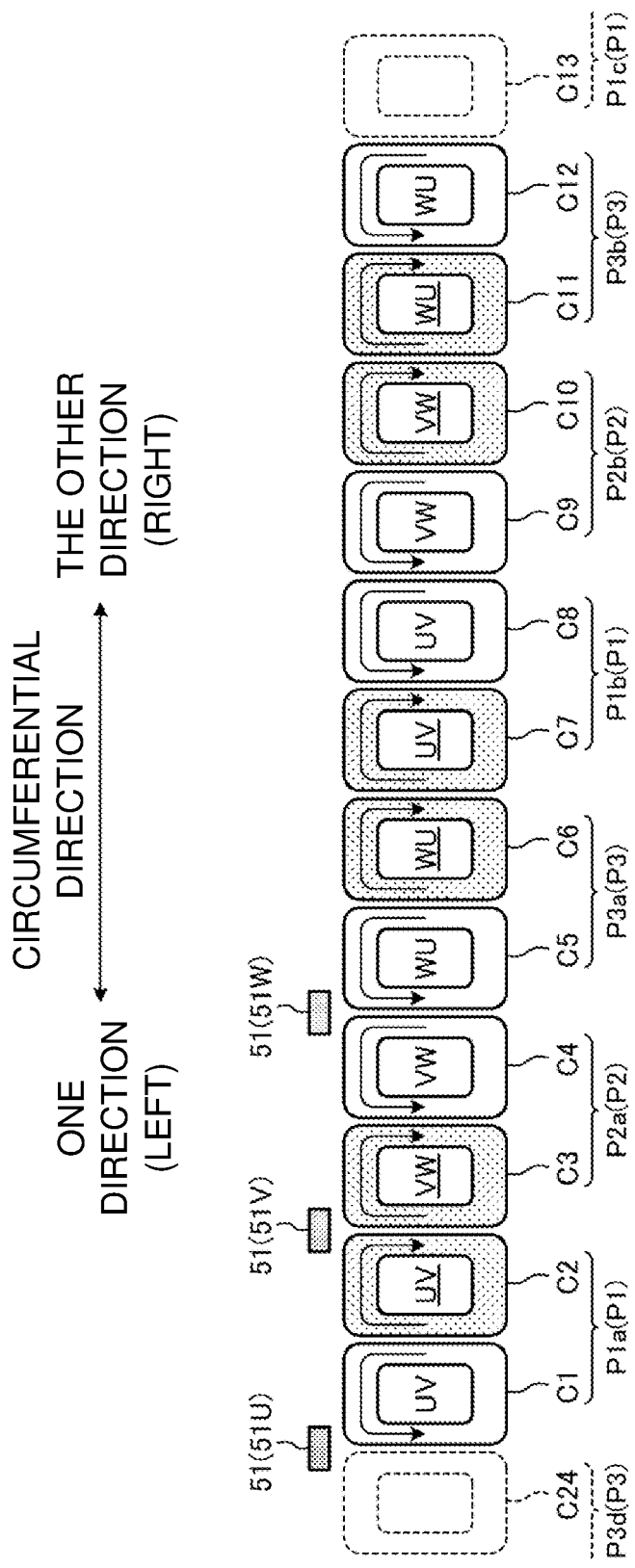
FIG. 23 is a schematic diagram of the coils in the embodiment.

FIG. 23 is a schematic diagram of the coils 33 in the embodiment. As shown in FIG. 23, in the circumferential direction, the magnetic sensor 51U may be located between the left coil C1 (one circumferential direction) in the first coil pair P1a and the right coil C24 (other circumferential direction) in the third coil pair P3d adjacent to the coil C1.

The magnetic sensor 51V may be located between the right coil C2 (other circumferential direction) in the first coil pair P1a and the left coil C3 (one circumferential direction) in the second coil pair P2a adjacent to the coil C2.

The magnetic sensor 51W may be located between the right coil C4 (other circumferential direction) in the second coil pair P2a and the left coil C5 (one circumferential direction) in the third coil pair P3a adjacent to the coil C4.

FIG. 23 is a diagram of an arrangement of the magnetic sensors 51 based on the angle of advance. The controller 100 controlling the inverter 102 may cause a control delay. The controller 100 may control the inverter 102 earlier to offset such a control delay. As shown in FIG. 23, the magnetic sensors 51 may be shifted to the left by one coil (one tooth) from the position shown in FIG. 20 to advance the control time by 30 electrical degrees.

As shown in FIGS. 16 and 17, the magnetic sensor 51U may be located between the coils C4 and C5. The magnetic sensor 51V may be located between the coils C6 and C7. The magnetic sensor 51W may be located between the coils C8 and C9.

As described above, the electric work machine 1 according to the embodiment includes the stator 30, the rotor 10 rotatable about the rotation axis AX, the magnetic sensors 51, the sensor board 50 supporting the magnetic sensors 51, and the cutting blade 5 as an output unit drivable by the rotor 10. The stator 30 includes the stator core 31 including the multiple teeth 31B, the insulator 32 fixed to the stator core 31, and the coils 33 wound around each of the multiple teeth 31B with the insulator 32 between them. The rotor 10 includes the rotor core 12 and the magnets 13 fixed to the rotor core 12. The magnetic sensors 51 detects the magnets 13.

The coils 33 include the coils C1 and C2 as first-phase coils assigned to the first phase, the coils C3 and C4 as second-phase coils assigned to the second phase, and the coils C5 and C6 as third-phase coils assigned to the third phase.

The two coils C1 and C2 adjacent to each other are included in the first coil pair P1a. The two coils C3 and C4 adjacent to each other are included in the second coil pair P2a. The two coils C5 and C6 adjacent to each other are included in the third coil pair P3a.

The second coil pair P2a is adjacent in the first circumferential direction to the third coil pair P3a, and the first coil pair P1a is adjacent in the first circumferential direction to the second coil pair P2a.

The coil C1 located in the first circumferential direction in the first coil pair P1a has a winding direction different from a winding direction of the coil C2 located in the second circumferential direction in the first coil pair P1a. The coil C3 located in the first circumferential direction in the second coil pair P2a has a winding direction different from a winding direction of the coil C4 located in the second circumferential direction in the second coil pair P2a. The coil C5 located in the first circumferential direction in third coil pair P3a has a winding direction different from a winding direction of the coil C6 located in the second circumferential direction in the third coil pair P3a.

In the first coil pair P1a and the second coil pair P2a adjacent to each other, the coil C2 located in the second circumferential direction in the first coil pair P1a and the coil C3 located in the first circumferential direction in the second coil pair P2a have the same winding direction. In the second coil pair P2a and the third coil pair P3a adjacent to each other, the coil C4 located in the second circumferential direction in the second coil pair P2a and the coil C5 located in the first circumferential direction in the third coil pair P3a have the same winding direction.

In the circumferential direction, the magnetic sensors 51 include the magnetic sensor 51U as a first magnetic sensor aligned with at least a portion of the first coil pair P1a, the magnetic sensor 51V as a second magnetic sensor aligned with at least a portion of the second coil pair P2a, and the magnetic sensor 51W as a third magnetic sensor aligned with at least a portion of the third coil pair P3a.

This arrangement of the coils 33 includes the magnetic sensor 51U circumferentially aligned with at least a portion of the first coil pair P1a, the magnetic sensor 51V circumferentially aligned with at least a portion of the second coil pair P2a, and the magnetic sensor 51W circumferentially aligned with at least a portion of the third coil pair P3a. Thus, the distance between the magnetic sensors 51U and 51V and the distance between the magnetic sensors 51V and the 51W are shorter. This downsizes the sensor board 50.

In the embodiment, the distance between the magnetic sensors 51U and 51V is equal to the distance between the magnetic sensors 51V and 51W in the circumferential direction.

This effectively downsizes the sensor board 50.

In the example described with reference to FIG. 20, the magnetic sensor 51U is between the coil C1 located in the first circumferential direction and the coil C2 located in the second circumferential direction in the first coil pair P1a. The magnetic sensor 51V is between the coil C3 located in the first circumferential direction and the coil C4 located in the second circumferential direction in the second coil pair P2a. The magnetic sensor 51W is between the coil C5 located in the first circumferential direction and the coil C6 in the second circumferential direction in the third coil pair P3a.

This effectively downsizes the sensor board 50. Each magnetic sensor 51 is located between the corresponding pair of coils 33 circumferentially adjacent to each other. This allows the magnetic sensors 51 to be less susceptible to the magnetic field from the coils 33. The magnetic sensors 51 can thus accurately detect the magnetic flux of the magnets 13.

In the example described with reference to FIG. 23, the magnetic sensor 51U is between the coil C1 located in the first circumferential direction in the first coil pair P1a and the coil C24 located in the second circumferential direction in the third coil pair P3d adjacent to the coil C1 located in the first circumferential direction. The magnetic sensor 51V is between the coil C2 located in the second circumferential direction in the first coil pair P1a and the coil C3 located in the first circumferential direction in the second coil pair P2a adjacent to the coil C2 located in the second circumferential direction. The magnetic sensor 51W is between the coil C4 located in the second circumferential direction in the second coil pair P2a and the coil C5 located in the first circumferential direction in the third coil pair P3a adjacent to the coil C4 located in the second circumferential direction.

This effectively downsizes the sensor board 50. Each magnetic sensor 51 is located between the corresponding pair of coils 33 circumferentially adjacent to each other. This allows the magnetic sensors 51 to be less susceptible to the magnetic field from the coils 33. The magnetic sensors 51 can thus accurately detect the magnetic flux of the magnets 13. Additionally, the motor 4 is controlled in accordance with the angle of advance, thus reducing a delay in the control of the motor 4.

In the embodiment, the two coils C1 and C2 in the first coil pair P1a are connected to each other in series and formed with the single wire 90. The two coils C3 and C4 in the second coil pair P2a are connected to each other in series and formed with the single wire 90. The two coils C5 and C6 in the third coil pair P3a are connected to each other in series and formed with the single wire 90.

The coils 33 are thus formed with fewer wires 90.

The electric work machine 1 according to the embodiment includes the controller 100 that supplies a driving current to the UV-phase coils 33 in response to a detection signal from the magnetic sensor 51U, to the VW-phase coils 33 in response to a detection signal from the magnetic sensor 51V, and to the WU-phase coils 33 in response to a detection signal from the magnetic sensor 51W.

This generates an appropriate rotating magnetic field in the motor 4 when a driving current is supplied to each of the UV-phase coils 33, the VW-phase coils 33, and the WU-phase coils 33 in response to the corresponding detection signals from the magnetic sensor 51U, 51V, and 51W.

In the embodiment, the magnetic sensors 51U, 51V, and 51W each output the detection signal switchable between a high-level detection signal and a low-level detection signal at every 180 electrical degrees in accordance with a change in the magnetic field resulting from the rotation of the rotor 10. The electric work machine 1 includes the switching circuit 104 that inverts the high-level detection signal and the low-level detection signal to be input into the controller 100 from the magnetic sensor 51V.

The above structure includes the magnetic sensors 51U and 51W under the magnetic field in a different direction from the magnetic field received by the magnetic sensor 51V. With the switching circuit 104 inverting the high-level detection signal and the low-level detection signal to be input into the controller 100 from the magnetic sensor 51V, the controller 100 receives the detection signals that are apparently the same as those from the magnetic sensors 51U, 51V, and 51W under the magnetic field in the same direction. Thus, the controller 100 can use, for example, an existing control logic to supply a driving current to the coils 33.

In the embodiment, the stator core 31 includes the cylindrical yoke 31A. The teeth 31B protrude radially outward from the outer circumferential surface of the yoke 31A. The rotor core 12 is located outside the periphery of the stator 30.

This can downsize the sensor board 50 in the outer-rotor motor 4.

The electric work machine 1 according to the embodiment includes the stator base 40 supporting the stator 30. The sensor board 50 is supported by the stator base 40.

Thus, the relative position between the stator 30 and the sensor board 50 supported by the stator base 40 is less likely to change. The relative position between the stator 30 and the rotor 10 is controlled with high accuracy. Thus, the relative position between the stator 30 and the sensor board 50 is less likely to change. The relative position between the sensor board 50 and the rotor 10 is controlled appropriately. Thus, the magnetic sensors 51 on the sensor board 50 can detect rotation of the rotor 10 appropriately.

The sensor board 50 in the embodiment is in contact with the stator base 40.

The relative position between the stator base 40 and the sensor board 50 is sufficiently less likely to change.

The electric work machine 1 according to the embodiment includes the rotor shaft 20 fixed to the rotor 10. The stator base 40 includes the pipe 43 located inside the stator core 31. The pipe 43 supports the rotor shaft 20 with the bearing 21 between them.

This prevents the electric work machine 1 from being upsized.

The magnets 13 in the embodiment are fixed to the inner circumferential surface of the rotor core 12.

This prevents the motor 4 from being upsized.

Other Embodiments

In the above embodiments, the electric work machine 1 is a lawn mower, which is an example of outdoor power equipment. Examples of the outdoor power equipment are not limited to lawn mowers. Examples of the outdoor power equipment include a hedge trimmer, a chain saw, a mower, and a blower. The electric work machine 1 may be a power tool. Examples of the power tool include a driver drill, a vibration driver drill, an angle drill, an impact driver, a grinder, a hammer, a hammer drill, a circular saw, and a reciprocating saw.

In the above embodiments, the electric work machine is powered by the battery pack attached to the battery mount. In some embodiments, the electric work machine may use utility power (alternating-current power supply).

Reference Signs List 1 electric work machine
2 housing
3 wheel
4 motor
5 cutting blade
6 grass box
7 handle
8 battery mount
9 battery pack
10 rotor
11 rotor cup
11A plate
11B yoke
11C opening
11F recess
12 rotor core
12E ring
12F inner protrusion
12G outer protrusion
13 magnet
14 bush
15 outlet
19 adhesive layer
20 rotor shaft
21 bearing
22 wave washer
23 bearing
30 stator
31 stator core
31A yoke
31B tooth
31C core threaded opening
32 insulator
32A upper end cover
32B lower end cover
32C outer circumference cover
32D tooth cover
33 coil
34 upper peripheral wall
35 lower peripheral wall
36 rib
37 protrusion
40 stator base
41 plate 42 peripheral wall
43 pipe
43A smaller-diameter portion
43B larger-diameter portion
43C base support surface
44 screw boss
44A base threaded hole
45 annular plate
46 screw boss
47 opening
48 shock absorber
49 base
49A base
49B base
49S support surface
50 sensor board
51 magnetic sensor
51U magnetic sensor
51V magnetic sensor
51W magnetic sensor
52 circuit board
53 resin layer
54 support area
54A support area
54B support area
60 motor housing
61 plate
62 peripheral wall
63 flange
64 pipe
65 annular plate
66 through-hole
67 screw
68 air passage
70 motor positioner
71 base flat area
72 base curved area
73 stator flat area
74 stator curved area
75 screw
80 board positioner
81 pin
82 screw
83 base pin hole
84 board pin hole
85 base threaded hole
86 board threaded opening
90 wire
91 power line
91U power line
91V power line
91W power line
92 fusing terminal
92U fusing terminal
92V fusing terminal
92W fusing terminal
100 controller
101 gate circuit
102 inverter
103 current detector
104 switching circuit
200 deck
201 through-hole
202 screw
203 baffle
203A opening
204 through-hole
205 screw
371 protrusion
372 protrusion
373 protrusion
374 protrusion
375 protrusion
376 protrusion
377 protrusion
600 screw boss
601 threaded hole
602 screw boss
603 threaded hole
901 wire
902 wire
903 wire
904 wire
905 wire
906 wire
907 wire
AX rotation axis

What is claimed is:

1. An electric work machine, comprising:
a stator (30) including
a stator core (31) including a plurality of teeth (31B),
an insulator (32) fixed to the stator core (31),
coils (33) each wound around a corresponding tooth (31B) of the plurality of teeth (31B) with the insulator (32) in between, the coils (33) including
a plurality of first-phase coils (C1, C2) assigned to a first phase,
a plurality of second-phase coils (C3, C4) assigned to a second phase, and
a plurality of third-phase coils (C5, C6) assigned to a third phase,
two of the plurality of first-phase coils (C1, C2) adjacent to each other being included in a first coil pair (P1a),
two of the plurality of second-phase coils (C3, C4) adjacent to each other being included in a second coil pair (P2a),
two of the plurality of third-phase coils (C5, C6) adjacent to each other being included in a third coil pair (P3a),
the second coil pair (P2a) being adjacent in a first circumferential direction to the third coil pair (P3a), the first coil pair (P1a) being adjacent in the first circumferential direction to the second coil pair (P2a),
the first coil pair (P1a) including a first-phase coil (C1) located in the first circumferential direction, the first-phase coil (C1) having a winding direction different from a winding direction of a first-phase coil (C2) located in a second circumferential direction in the first coil pair (P1a),
the second coil pair (P2a) including a second-phase coil (C3) located in the first circumferential direction, the second-phase coil (C3) having a winding direction different from a winding direction of a second-phase coil (C4) located in the second circumferential direction in the second coil pair (P2a),
the third coil pair (P3a) including a third-phase coil (C5) located in the first circumferential direction, the third-phase coil (C5) having a winding direction different from a winding direction of a third-phase coil (C6) located in the second circumferential direction in the third coil pair (P3a), the first coil pair (P1a) and the second coil pair (P2a) adjacent to each other including the first-phase coil (C2) located in the second circumferential direction in the first coil pair (P1a) and the second-phase coil (C3) located in the first circumferential direction in the second coil pair (P2a), the first-phase coil (C2) and the second-phase coil (C3) having a same winding direction, the second coil pair (P2a) and the third coil pair (P3a) adjacent to each other including the second-phase coil (C4) located in the second circumferential direction in the second coil pair (P2a) and the third-phase coil (C5) located in the first circumferential direction in the third coil pair (P3a), the second-phase coil (C4) and the third-phase coil (C5) having a same winding direction;

a rotor (10) rotatable about a rotation axis (AX), the rotor (10) including
 a rotor core (12), and
 a plurality of magnets (13) fixed to the rotor core (12);
a plurality of magnetic sensors (51) configured to detect the plurality of magnets (13), the plurality of magnetic sensors (51) including, in a circumferential direction,
 a first magnetic sensor (51U) aligned with at least a portion of the first coil pair (P1a),
 a second magnetic sensor (51V) aligned with at least a portion of the second coil pair (P2a), and
 a third magnetic sensor (51W) aligned with at least a portion of the third coil pair (P3a);
a sensor board (50) supporting the magnetic sensors (51); and
an output unit (5) drivable by the rotor (10),
wherein
the first magnetic sensor (51U) is between the first-phase coil (C1) located in the first circumferential direction and the first-phase coil (C2) located in the second circumferential direction in the first coil pair (P1a),
the second magnetic sensor (51V) is between the second-phase coil (C3) located in the first circumferential direction and the second-phase coil (C4) located in the second circumferential direction in the second coil pair (P2a), and
the third magnetic sensor (51W) is between the third-phase coil (C5) located in the first circumferential direction and the third-phase coil (C6) located in the second circumferential direction in the third coil pair (P3a).

2. The electric work machine according to claim 1, wherein
a distance between the first magnetic sensor (51U) and the second magnetic sensor (51V) is equal to a distance between the second magnetic sensor (51V) and the third magnetic sensor (51W) in the circumferential direction.

3. The electric work machine according to claim 2, wherein
the first coil pair (P1a) includes the two first-phase coils (C1, C2) connected to each other in series, and the two first-phase coils (C1, C2) are first-phase coils formed with a single wire (90),
the second coil pair (P2a) includes the two second-phase coils (C3, C4) connected to each other in series, and the two second-phase coils (C3, C4) are second-phase coils formed with the single wire (90), and the third coil pair (P3a) includes the two third-phase coils (C5, C6) connected to each other in series, and the two third-phase coils (C5, C6) are third-phase coils formed with the single wire (90).

4. The electric work machine according to claim 2, further comprising:
a controller (100) configured to supply a driving current to the plurality of first-phase coils (33) in response to a detection signal from the first magnetic sensor (51U), to the plurality of second-phase coils (33) in response to a detection signal from the second magnetic sensor (51V), and to the plurality of third-phase coils (33) in response to a detection signal the third magnetic sensor (51W).

5. The electric work machine according to claim 1, wherein
the first coil pair (P1a) includes the two first-phase coils (C1, C2) connected to each other in series, and the two first-phase coils (C1, C2) are first-phase coils formed with a single wire (90),
the second coil pair (P2a) includes the two second-phase coils (C3, C4) connected to each other in series, and the two second-phase coils (C3, C4) are second-phase coils formed with the single wire (90), and
the third coil pair (P3a) includes the two third-phase coils (C5, C6) connected to each other in series, and the two third-phase coils (C5, C6) are third-phase coils formed with the single wire (90).

6. The electric work machine according to claim 1, further comprising:
a controller (100) configured to supply a driving current to the plurality of first-phase coils (33) in response to a detection signal from the first magnetic sensor (51U), to the plurality of second-phase coils (33) in response to a detection signal from the second magnetic sensor (51V), and to the plurality of third-phase coils (33) in response to a detection signal the third magnetic sensor (51W).

7. The electric work machine according to claim 1, wherein
the stator core (31) includes a yoke (31A) being cylindrical,
the plurality of teeth (31B) protrude radially outward from an outer circumferential surface of the yoke (31A), and
the rotor core (12) is located outside a periphery of the stator (30).

8. The electric work machine according to claim 7, further comprising:
a stator base (40) supporting the stator (30),
wherein the sensor board (50) is supported by the stator base (40).

9. The electric work machine according to claim 8, wherein
the sensor board (50) is in contact with the stator base (40).

10. The electric work machine according to claim 8, further comprising:
a rotor shaft (20) fixed to the rotor (10),
wherein the stator base (40) includes a pipe (43) located inside the stator core (31), and
the pipe (43) supports the rotor shaft (20) with a bearing (21) in between.

11. The electric work machine according to claim 7, wherein
the plurality of magnets (13) are fixed to an inner circumferential surface of the rotor core (12).

12. An electric work machine, comprising:
a stator (30) including
  a stator core (31) including a plurality of teeth (31B),
  an insulator (32) fixed to the stator core (31),
  coils (33) each wound around a corresponding tooth (31B) of the plurality of teeth (31B) with the insulator (32) in between, the coils (33) including
    a plurality of first-phase coils (C1, C2) assigned to a first phase,
    a plurality of second-phase coils (C3, C4) assigned to a second phase, and
    a plurality of third-phase coils (C5, C6) assigned to a third phase,
    two of the plurality of first-phase coils (C1, C2) adjacent to each other being included in a first coil pair (P1a),
    two of the plurality of second-phase coils (C3, C4) adjacent to each other being included in a second coil pair (P2a),
    two of the plurality of third-phase coils (C5, C6) adjacent to each other being included in a third coil pair (P3a),
    the second coil pair (P2a) being adjacent in a first circumferential direction to the third coil pair (P3a), the first coil pair (P1a) being adjacent in the first circumferential direction to the second coil pair (P2a),
    the first coil pair (P1a) including a first-phase coil (C1) located in the first circumferential direction, the first-phase coil (C1) having a winding direction different from a winding direction of a first-phase coil (C2) located in a second circumferential direction in the first coil pair (P1a),
    the second coil pair (P2a) including a second-phase coil (C3) located in the first circumferential direction, the second-phase coil (C3) having a winding direction different from a winding direction of a second-phase coil (C4) located in the second circumferential direction in the second coil pair (P2a),
    the third coil pair (P3a) including a third-phase coil (C5) located in the first circumferential direction, the third-phase coil (C5) having a winding direction different from a winding direction of a third-phase coil (C6) located in the second circumferential direction in the third coil pair (P3a),
    the first coil pair (P1a) and the second coil pair (P2a) adjacent to each other including the first-phase coil (C2) located in the second circumferential direction in the first coil pair (P1a) and the second-phase coil (C3) located in the first circumferential direction in the second coil pair (P2a), the first-phase coil (C2) and the second-phase coil (C3) having a same winding direction,
    the second coil pair (P2a) and the third coil pair (P3a) adjacent to each other including the second-phase coil (C4) located in the second circumferential direction in the second coil pair (P2a) and the third-phase coil (C5) located in the first circumferential direction in the third coil pair (P3a), the second-phase coil (C4) and the third-phase coil (C5) having a same winding direction;
a rotor (10) rotatable about a rotation axis (AX), the rotor (10) including
  a rotor core (12), and
  a plurality of magnets (13) fixed to the rotor core (12);
a plurality of magnetic sensors (51) configured to detect the plurality of magnets (13), the plurality of magnetic sensors (51) including, in a circumferential direction,
  a first magnetic sensor (51U) aligned with at least a portion of the first coil pair (P1a),
  a second magnetic sensor (51V) aligned with at least a portion of the second coil pair (P2a), and
  a third magnetic sensor (51W) aligned with at least a portion of the third coil pair (P3a);
a sensor board (50) supporting the magnetic sensors (51); and
an output unit (5) drivable by the rotor (10), wherein
the first magnetic sensor (51U) is between the first-phase coil (C1) located in the first circumferential direction in the first coil pair (P1a) and the third-phase coil (C24) located in the second circumferential direction in the third coil pair (P3a) adjacent to the first-phase coil (C1) located in the first circumferential direction,
the second magnetic sensor (51V) is between the first-phase coil (C2) located in the second circumferential direction in the first coil pair (P1a) and the second-phase coil (C3) located in the first circumferential direction in the second coil pair (P2a) adjacent to the first-phase coil (C2) located in the second circumferential direction, and
the third magnetic sensor (51W) is between the second-phase coil (C4) located in the second circumferential direction in the second coil pair (P2a) and the third-phase coil (C5) located in the first circumferential direction in the third coil pair (P3a) adjacent to the second-phase coil (C4) located in the second circumferential direction.

13. The electric work machine according to claim 12, wherein
the first coil pair (P1a) includes the two first-phase coils (C1, C2) connected to each other in series, and the two first-phase coils (C1, C2) are first-phase coils formed with a single wire (90),
the second coil pair (P2a) includes the two second-phase coils (C3, C4) connected to each other in series, and the two second-phase coils (C3, C4) are second-phase coils formed with the single wire (90), and
the third coil pair (P3a) includes the two third-phase coils (C5, C6) connected to each other in series, and the two third-phase coils (C5, C6) are third-phase coils formed with the single wire (90).

14. The electric work machine according to claim 12, further comprising:
a controller (100) configured to supply a driving current to the plurality of first-phase coils (33) in response to a detection signal from the first magnetic sensor (51U), to the plurality of second-phase coils (33) in response to a detection signal from the second magnetic sensor (51V), and to the plurality of third-phase coils (33) in response to a detection signal the third magnetic sensor (51W).

15. An electric work machine, comprising:
a stator (30) including
  a stator core (31) including a plurality of teeth (31B),
  an insulator (32) fixed to the stator core (31),
  coils (33) each wound around a corresponding tooth (31B) of the plurality of teeth (31B) with the insulator (32) in between, the coils (33) including
    a plurality of first-phase coils (C1, C2) assigned to a first phase,
    a plurality of second-phase coils (C3, C4) assigned to a second phase, and a plurality of third-phase coils (C5, C6) assigned to a third phase, two of the plurality of first-phase coils (C1, C2) adjacent to each other being included in a first coil pair (P1a), two of the plurality of second-phase coils (C3, C4) adjacent to each other being included in a second coil pair (P2a), two of the plurality of third-phase coils (C5, C6) adjacent to each other being included in a third coil pair (P3a), the second coil pair (P2a) being adjacent in a first circumferential direction to the third coil pair (P3a), the first coil pair (P1a) being adjacent in the first circumferential direction to the second coil pair (P2a), the first coil pair (P1a) including a first-phase coil (C1) located in the first circumferential direction, the first-phase coil (C1) having a winding direction different from a winding direction of a first-phase coil (C2) located in a second circumferential direction in the first coil pair (P1a), the second coil pair (P2a) including a second-phase coil (C3) located in the first circumferential direction, the second-phase coil (C3) having a winding direction different from a winding direction of a second-phase coil (C4) located in the second circumferential direction in the second coil pair (P2a), the third coil pair (P3a) including a third-phase coil (C5) located in the first circumferential direction, the third-phase coil (C5) having a winding direction different from a winding direction of a third-phase coil (C6) located in the second circumferential direction in the third coil pair (P3a), the first coil pair (P1a) and the second coil pair (P2a) adjacent to each other including the first-phase coil (C2) located in the second circumferential direction in the first coil pair (P1a) and the second-phase coil (C3) located in the first circumferential direction in the second coil pair (P2a), the first-phase coil (C2) and the second-phase coil (C3) having a same winding direction, the second coil pair (P2a) and the third coil pair (P3a) adjacent to each other including the second-phase coil (C4) located in the second circumferential direction in the second coil pair (P2a) and the third-phase coil (C5) located in the first circumferential direction in the third coil pair (P3a), the second-phase coil (C4) and the third-phase coil (C5) having a same winding direction;

a rotor (10) rotatable about a rotation axis (AX), the rotor (10) including
a rotor core (12), and
a plurality of magnets (13) fixed to the rotor core (12);

a plurality of magnetic sensors (51) configured to detect the plurality of magnets (13), the plurality of magnetic sensors (51) including, in a circumferential direction,
a first magnetic sensor (51U) aligned with at least a portion of the first coil pair P1a),
a second magnetic sensor (51V) aligned with at least a portion of the second coil pair (P2a), and
a third magnetic sensor (51W) aligned with at least a portion of the third coil pair (P3a);

a sensor board (50) supporting the magnetic sensors (51);

an output unit (5) drivable by the rotor (10); and a controller (100) configured to supply a driving current to the plurality of first-phase coils (33) in response to a detection signal from the first magnetic sensor (51U), to the plurality of second-phase coils (33) in response to a detection signal from the second magnetic sensor (51V), and to the plurality of third-phase coils (33) in response to a detection signal the third magnetic sensor (51W), wherein the first magnetic sensor (51U), the second magnetic sensor (51V), and the third magnetic sensor (51W) each output the detection signal switchable between a high-level detection signal and a low-level detection signal at every 180 electrical degrees in accordance with a change in a magnetic field resulting from rotation of the rotor (10), and the electric work machine further comprises a switching circuit (104) configured to invert the high-level detection signal and the low-level detection signal to be input into the controller (100) from the second magnetic sensor (51V).

* * * * *